United States Patent
Hwang et al.

(10) Patent No.: US 11,637,677 B2
(45) Date of Patent: Apr. 25, 2023

(54) METHOD AND DEVICE FOR TRANSMITTING DMRS FOR PSSCH IN NR V2X

(71) Applicant: LG ELECTRONICS INC., Seoul (KR)

(72) Inventors: Daesung Hwang, Seoul (KR); Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/667,264

(22) Filed: Feb. 8, 2022

(65) Prior Publication Data

US 2022/0166588 A1 May 26, 2022

Related U.S. Application Data

(63) Continuation of application No. PCT/KR2020/010203, filed on Aug. 3, 2020.
(Continued)

(30) Foreign Application Priority Data

Aug. 15, 2019 (KR) .................. 10-2019-0100007
Oct. 2, 2019 (KR) .................. 10-2019-0122635

(51) Int. Cl.
*H04L 5/00* (2006.01)
*H04W 4/40* (2018.01)

(52) U.S. Cl.
CPC ............. *H04L 5/0053* (2013.01); *H04W 4/40* (2018.02)

(58) Field of Classification Search
CPC ....... H04L 5/0053; H04L 5/0055–0057; H04L 5/0044–0048; H04L 5/0051–0057;
(Continued)

(56) References Cited

U.S. PATENT DOCUMENTS

2018/0212733 A1    7/2018  Khoryaev et al.
2021/0360603 A1*  11/2021  Wang ................ H04L 5/0053
2022/0045816 A1*   2/2022  Suzuki .............. H04L 5/0051

FOREIGN PATENT DOCUMENTS

WO         2019137274         7/2019
WO    WO-2022011594 A1  *  1/2022

OTHER PUBLICATIONS

Mitsubishi Electric, Physical layer design for NR V2X sidelink, R1-1907024, 3GPP TSG RAN WG1 #97, May 3, 2019, see sections 2.1.1-2.1.3 and 5.
(Continued)

*Primary Examiner* — Thomas R Cairns
(74) *Attorney, Agent, or Firm* — Dentons US LLP

(57) ABSTRACT

Proposed is a method for a first device for communicating wirelessly. The method can comprise a step of, from a second device, transmitting sidelink control information (SCI) comprising information relating to a demodulation reference signal (DMRS) pattern by means of a physical sidelink control channel (PSCCH) to the second device, mapping the DMRS on resources relating to a physical sidelink shared channel (PSSCH) on the basis of the information relating to the DMRS pattern and the length of a symbol duration of the PSSCH relating to the PSCCH, and transmitting the DMRS to the second device by means of the PSSCH.

10 Claims, 30 Drawing Sheets

Related U.S. Application Data

(60) Provisional application No. 62/938,237, filed on Nov. 20, 2019.

(58) Field of Classification Search
CPC . H04L 27/2608; H04L 27/2627–2644; H04W 4/40–48; H04W 8/005; H04W 76/14; H04W 84/18; H04W 88/04; H04W 56/001–0025
See application file for complete search history.

(56) References Cited

OTHER PUBLICATIONS

Oppo, Physical layer structure for NR-V2X, R1-1906472, 3GPP TSG RAN WG1 #97, May 3, 2019, see sections 2.1 and 3.2.
Xiaomi, Discussion on physical layer structure for 5G V2X, R1-1906571, 3GPP TSG RAN WG1 #97, May 2, 2019, see section 2.1.
R1-1903945: Huawei, HiSilicon, 3GPP TSG RAN WG1 Meeting #96bis, Xi'an, China, Apr. 8-12, 2019, "Sidelink reference signal for NR V2X," (12 Pages).
R1-1907012: LG Electronics, 3GPP TSG RAN WG1 #97, Reno, USA, May 13-17, 2019, "Discussion on Physical Layer Structure for NR Sidelink," (25 Pages).

\* cited by examiner

FIG. 4
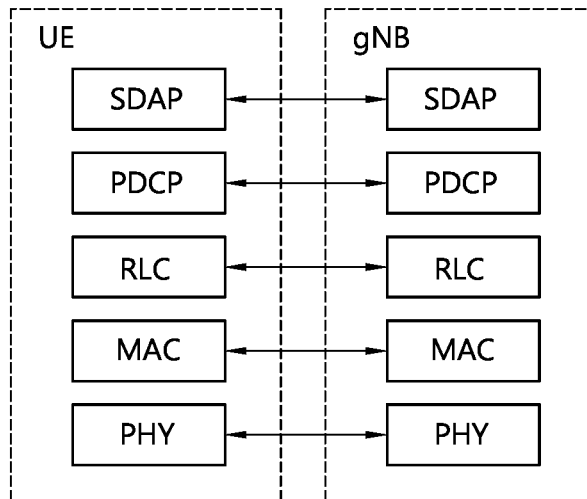
(a)
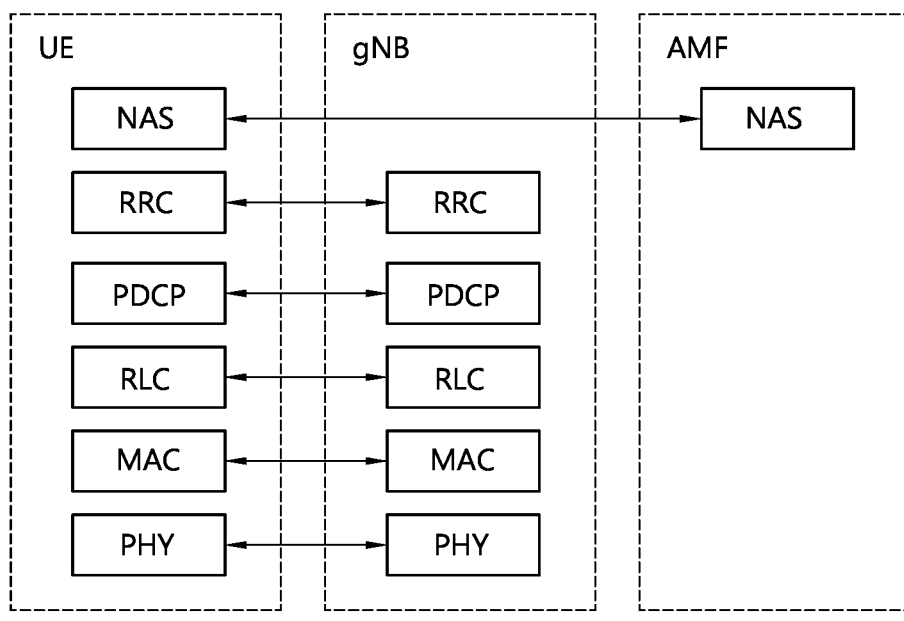
(b)

FIG. 8
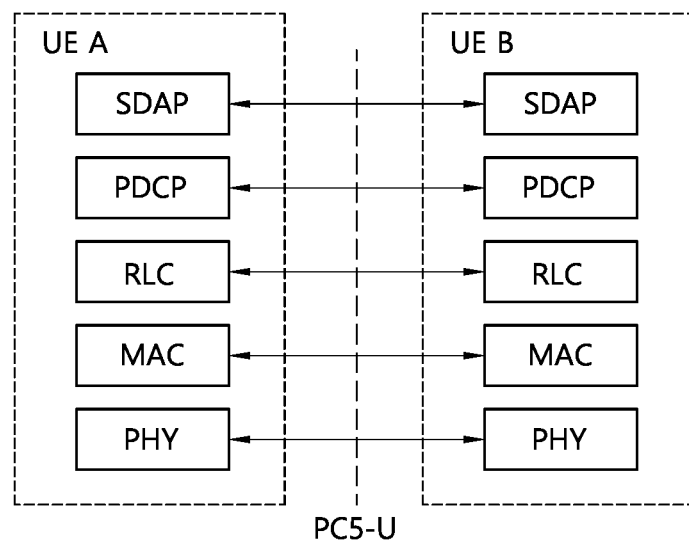
(a)
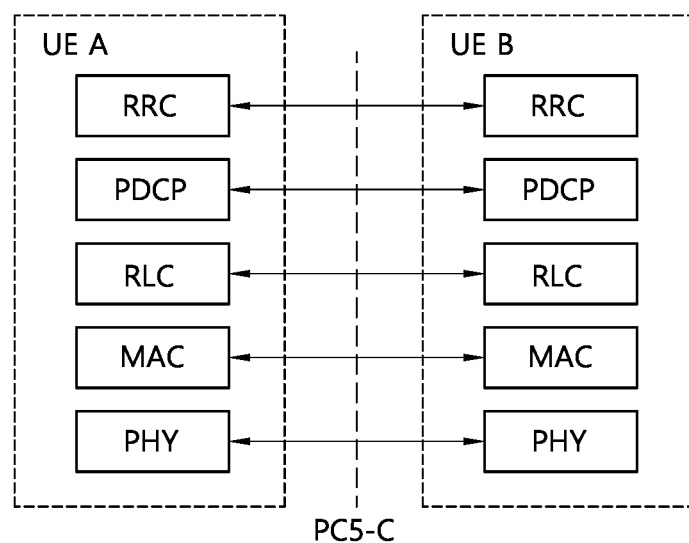
(b)

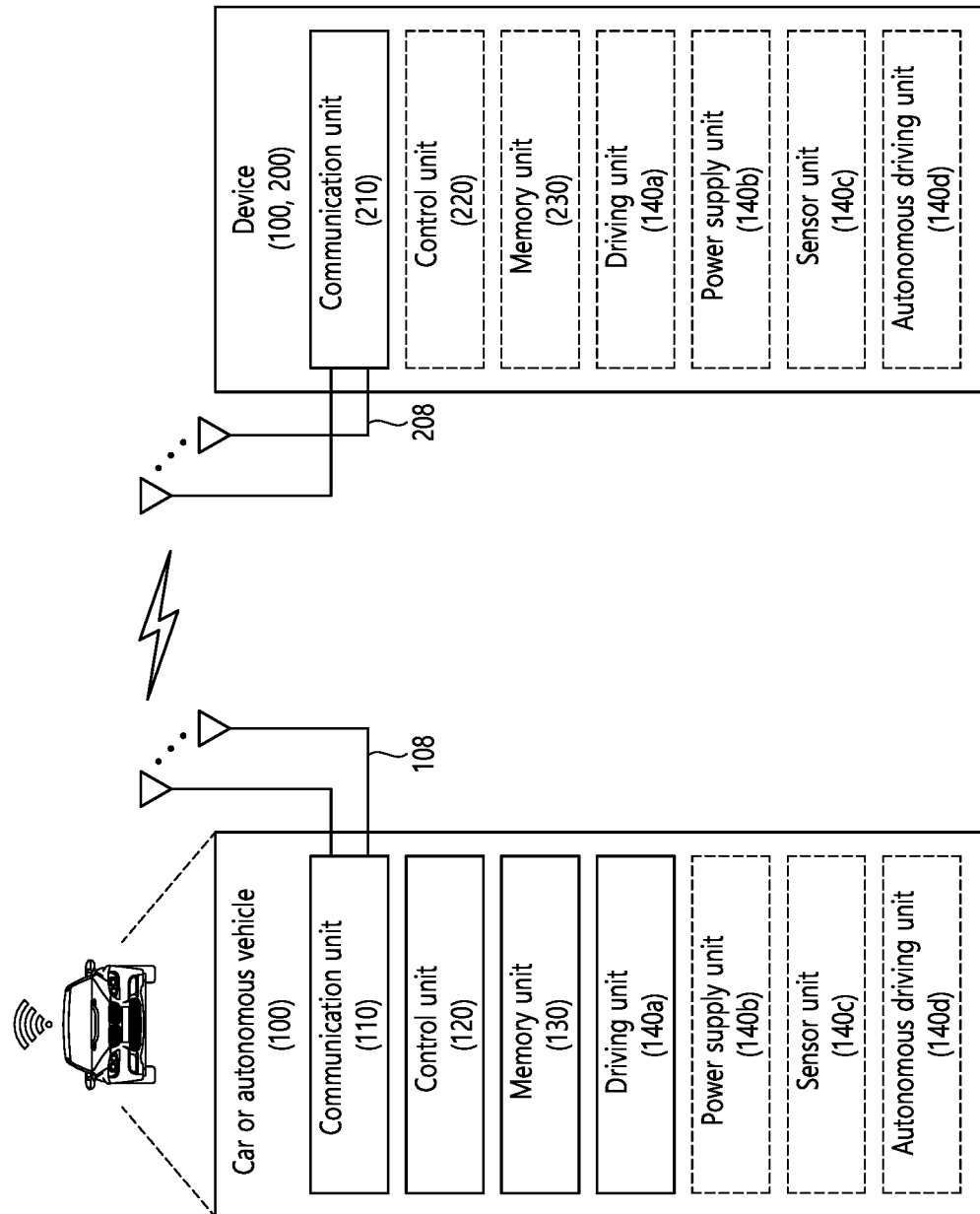

METHOD AND DEVICE FOR TRANSMITTING DMRS FOR PSSCH IN NR V2X

This application is a Continuation Bypass of International Application No. PCT/KR2020/010203 filed on Aug. 3, 2020, which claims the benefit of U.S. Provisional Application No. 62/938,237 filed on Nov. 20, 2019 and Korean Patent Application Nos. 10-2019-0100007 filed on Aug. 15, 2019 and 10-2019-0122635 filed on Oct. 2, 2019, the contents of which are all hereby incorporated by reference herein in their entirety.

BACKGROUND OF THE DISCLOSURE

Field of the Disclosure

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE DISCLOSURE

Technical Objects

Meanwhile, in order to increase a usage efficiency of resources for data, for the NR system, a form in which resources for a physical sidelink control channel (PSCCH) are superimposed on resources for a physical sidelink shared channel (PSSCH) or a form in which resources for a PSCCH are surrounded by resources for a PSSCH may be supported.

In this case, for example, when a length of a symbol duration of the PSCCH is relatively larger than a length of a symbol duration of a control resource set (CORESET) for a downlink, if the transmitting terminal does not map a PSSCH demodulation reference signal (DMRS) in the PSSCH resources of the frequency division multiplexing (FDM) area with the PSCCH, the PSSCH detection performance of the receiving terminal may be deteriorated. In addition, for example, when the PSCCH and the PSSCH are time division multiplexing (TDM), if PSSCH DMRS is not mapped after resources related to the PSCCH, it may cause deterioration of the detection performance of the receiving terminal for the PSSCH.

Technical Solutions

According to an embodiment of the present disclosure, there is provided a method of performing wireless communication by a first device. The method may include transmitting, to a second device through a physical sidelink control channel (PSCCH), a sidelink control information (SCI) including information related to a pattern of a demodulation reference signal (DMRS), mapping a DMRS onto resources related to a physical sidelink shared channel (PSSCH) based on the information related to the pattern of the DMRS and a length of a symbol duration of the PSSCH related to the PSCCH, and transmitting, to the second device through the PSSCH, the DMRS.

Effects of the Disclosure

A UE may effectively perform sidelink communication.

BRIEF DESCRIPTION OF THE DRAWINGS

FIG. 4 shows a radio protocol architecture, in accordance with an embodiment of the present disclosure.

FIG. 8 shows a radio protocol architecture for a SL communication, in accordance with an embodiment of the present disclosure.

FIG. 30 shows a car or an autonomous vehicle, in accordance with an embodiment of the present disclosure.

DESCRIPTION OF EXEMPLARY EMBODIMENTS

Figure 1:
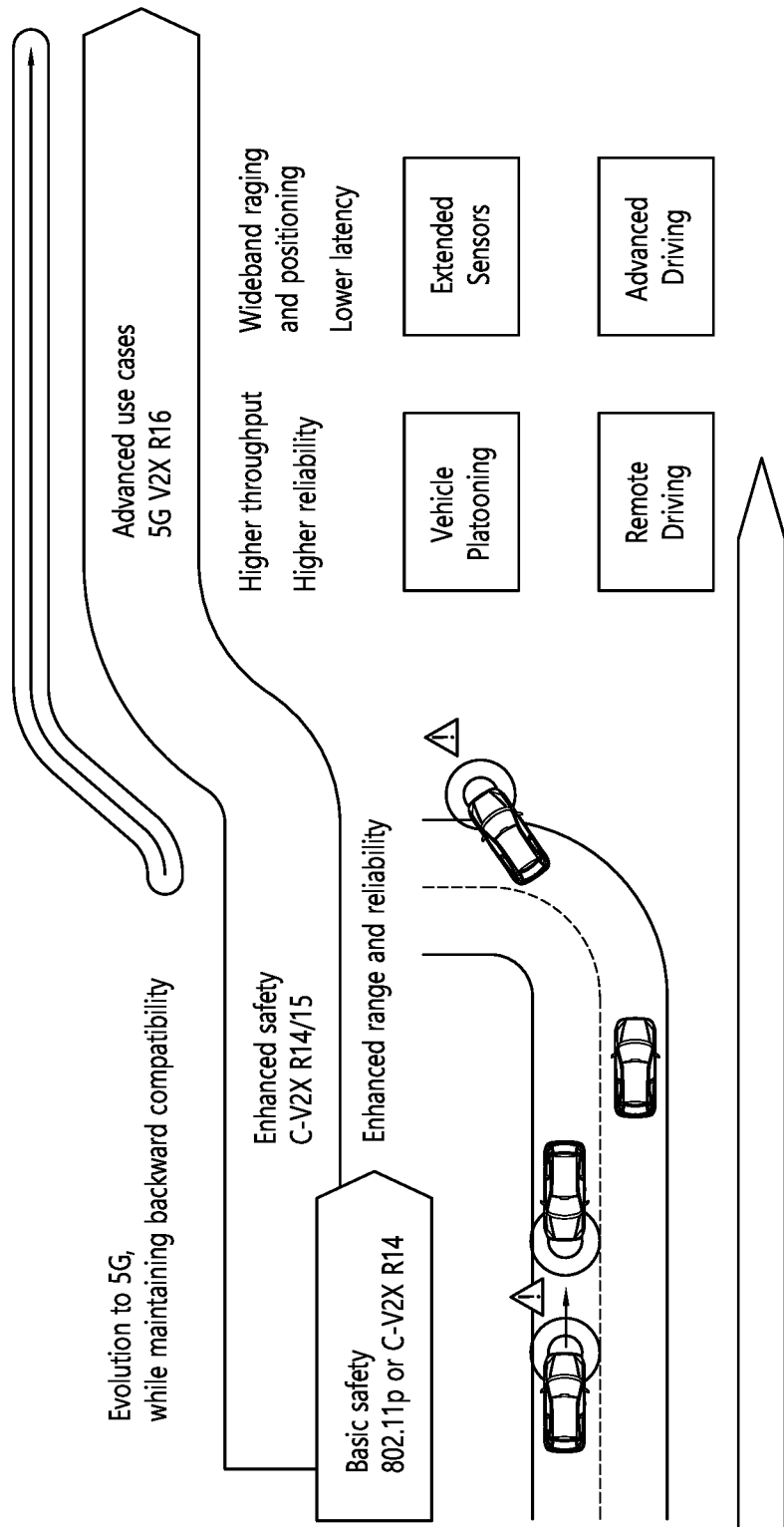
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B". p In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
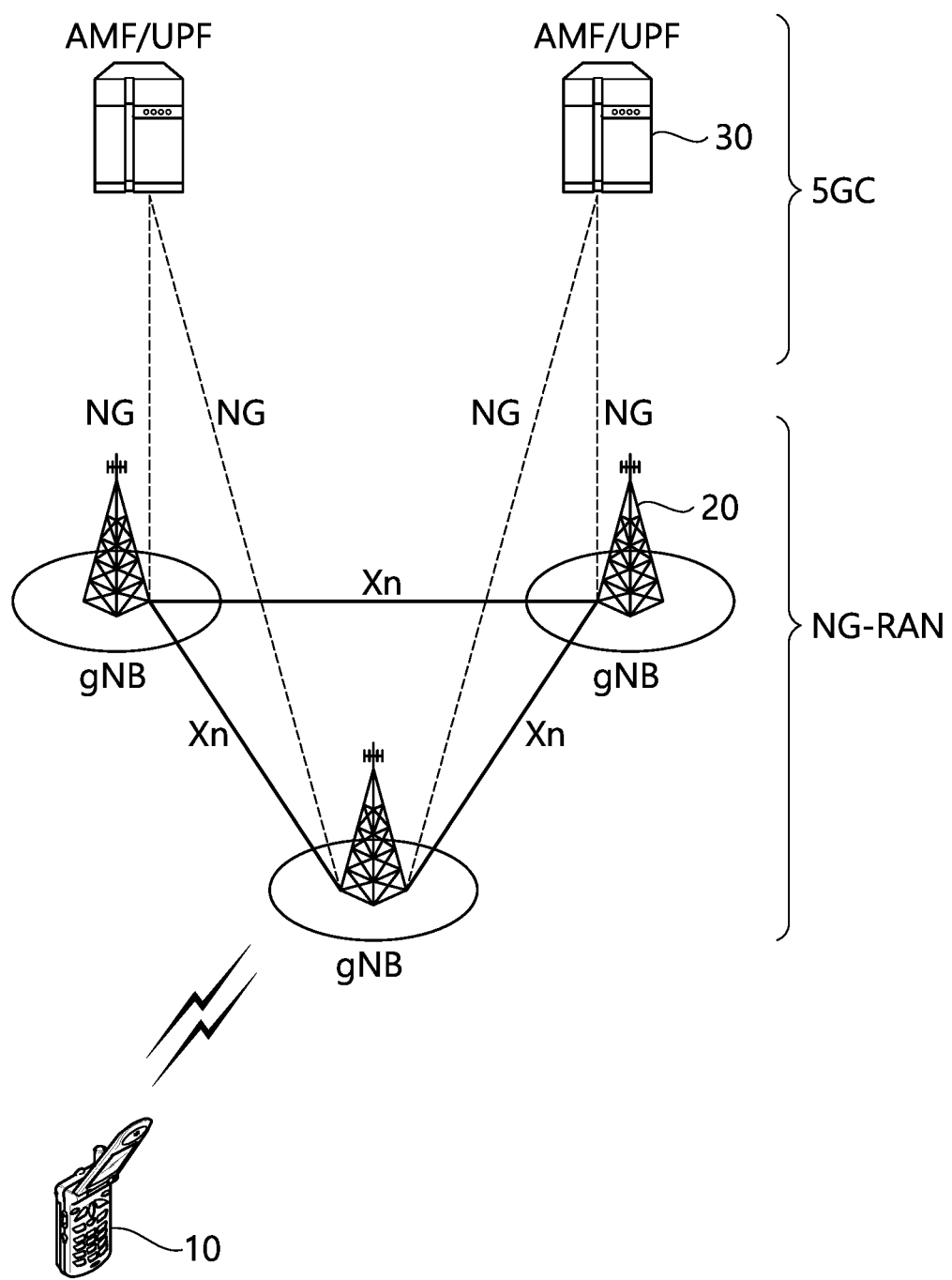
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
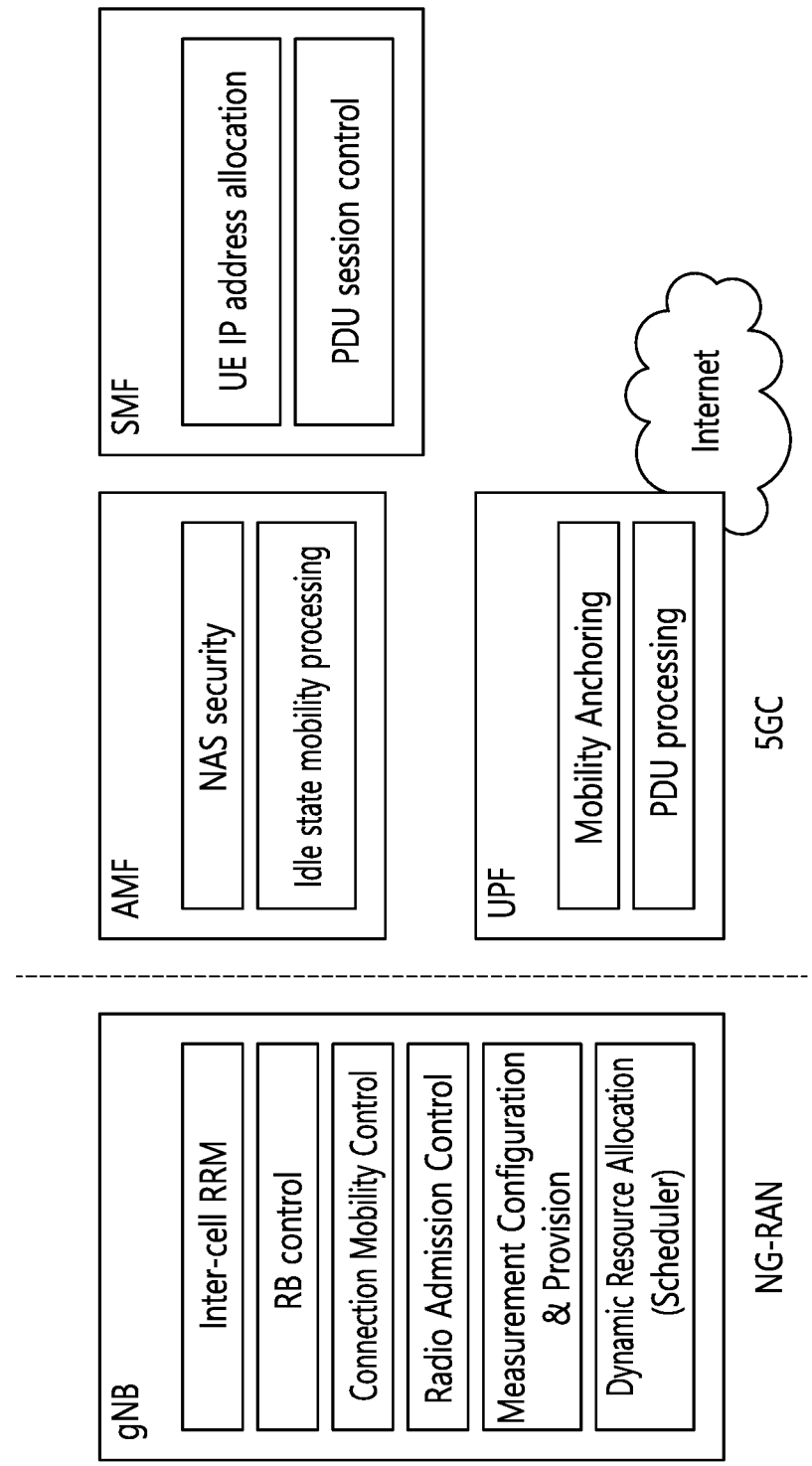
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

FIG. 4 shows a radio protocol architecture, in accordance with an embodiment of the present disclosure. The embodiment of FIG. 4 may be combined with various embodiments of the present disclosure. Specifically, FIG. 4(a) shows a radio protocol architecture for a user plane, and FIG. 4(b) shows a radio protocol architecture for a control plane. The user plane corresponds to a protocol stack for user data transmission, and the control plane corresponds to a protocol stack for control signal transmission.

Referring to FIG. 4, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each sub-frame may use specific sub-carriers of specific OFDM symbols (e.g., a first OFDM symbol) of a corresponding subframe for a physical downlink control channel (PDCCH), i.e., an L1/L2 control channel A transmission time interval (TTI) is a unit time of subframe transmission.

Figure 5:
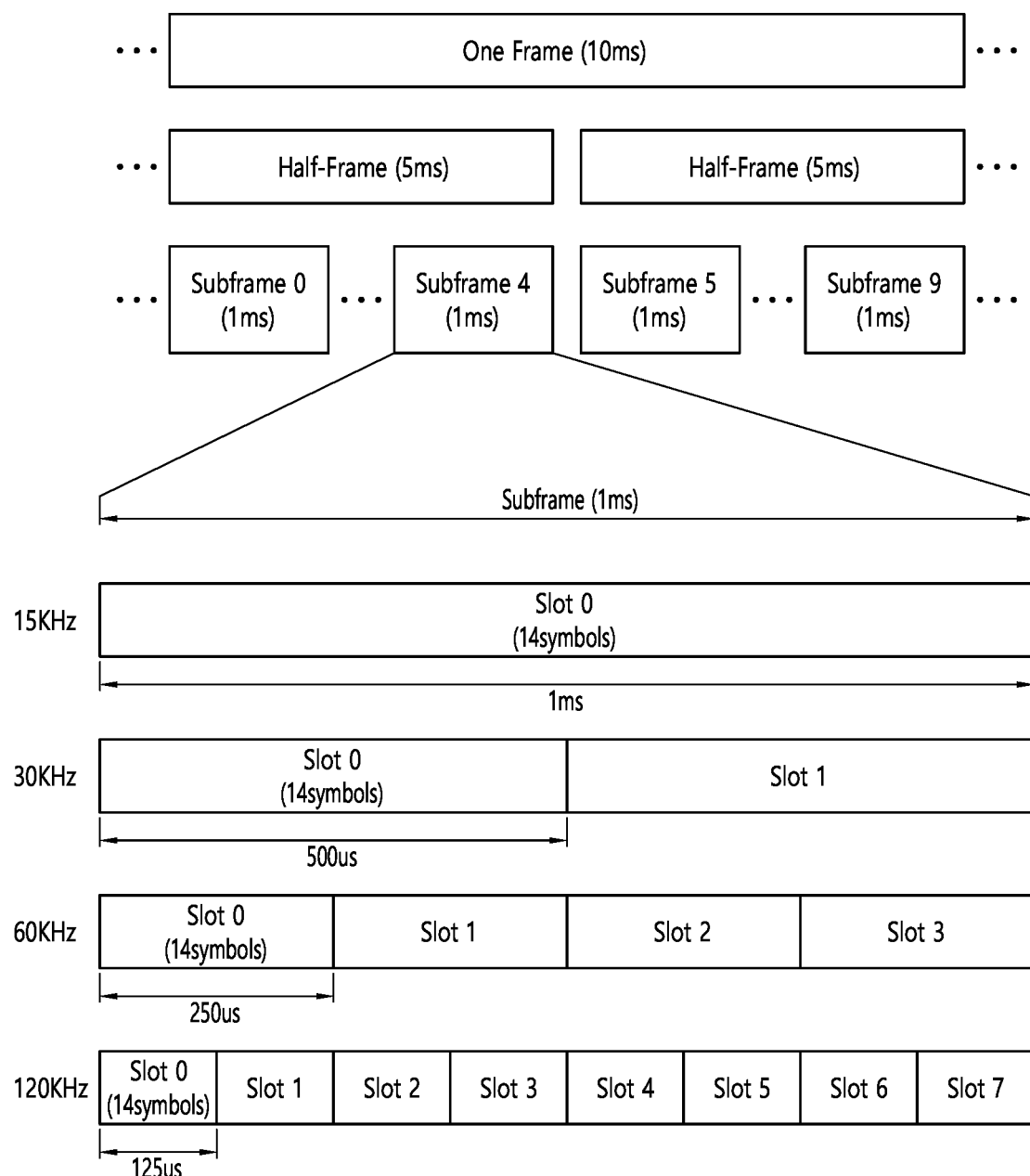
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$) a number slots per frame ($N^{frame,u}_{slot}$), and a number of slots per subframe ($N^{subframe,u}_{slot}$) based on an SCS configuration (u), in a case where a normal CP is used.

TABLE 1

| SCS ($15*2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS ($15*2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table 3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
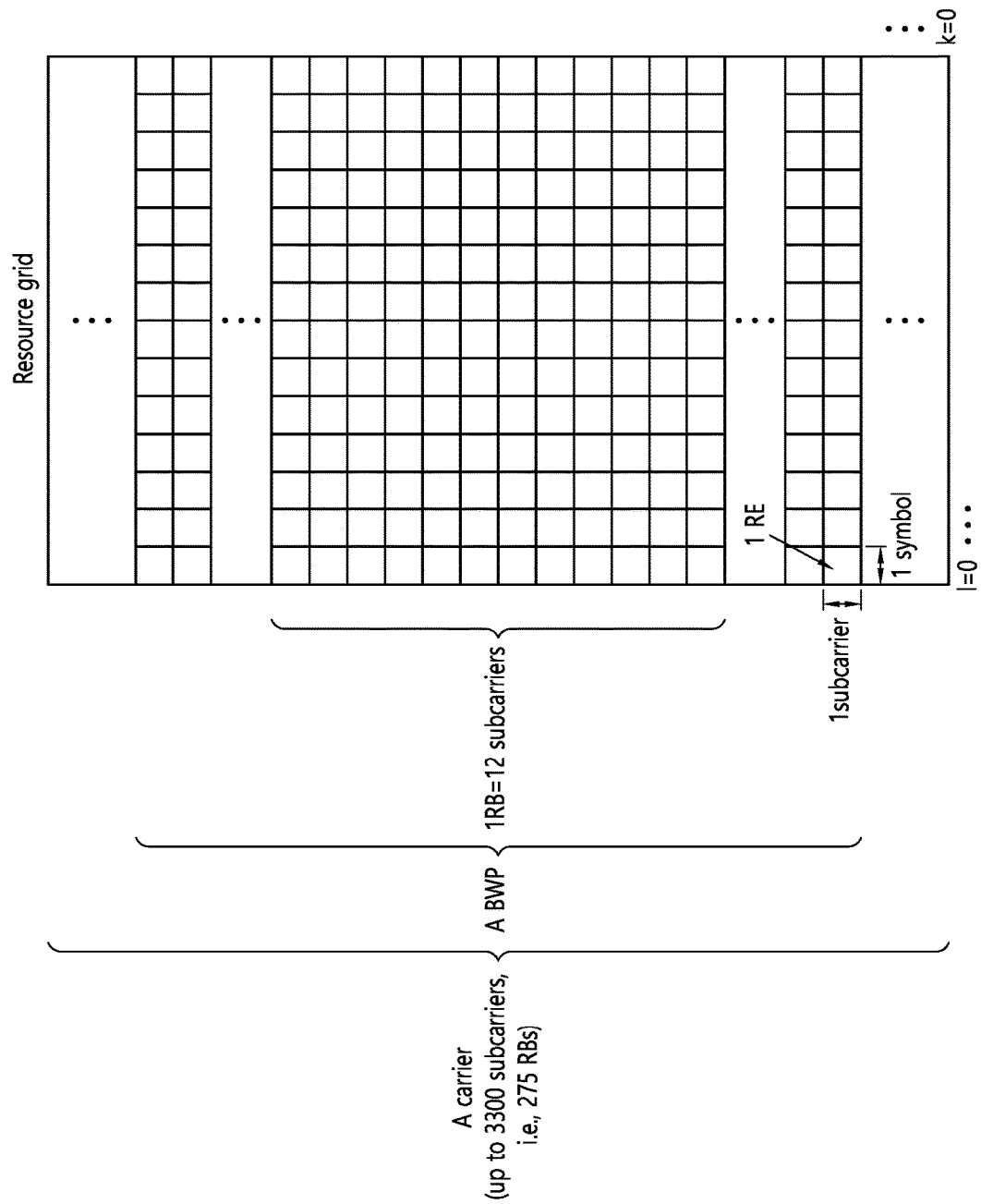
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
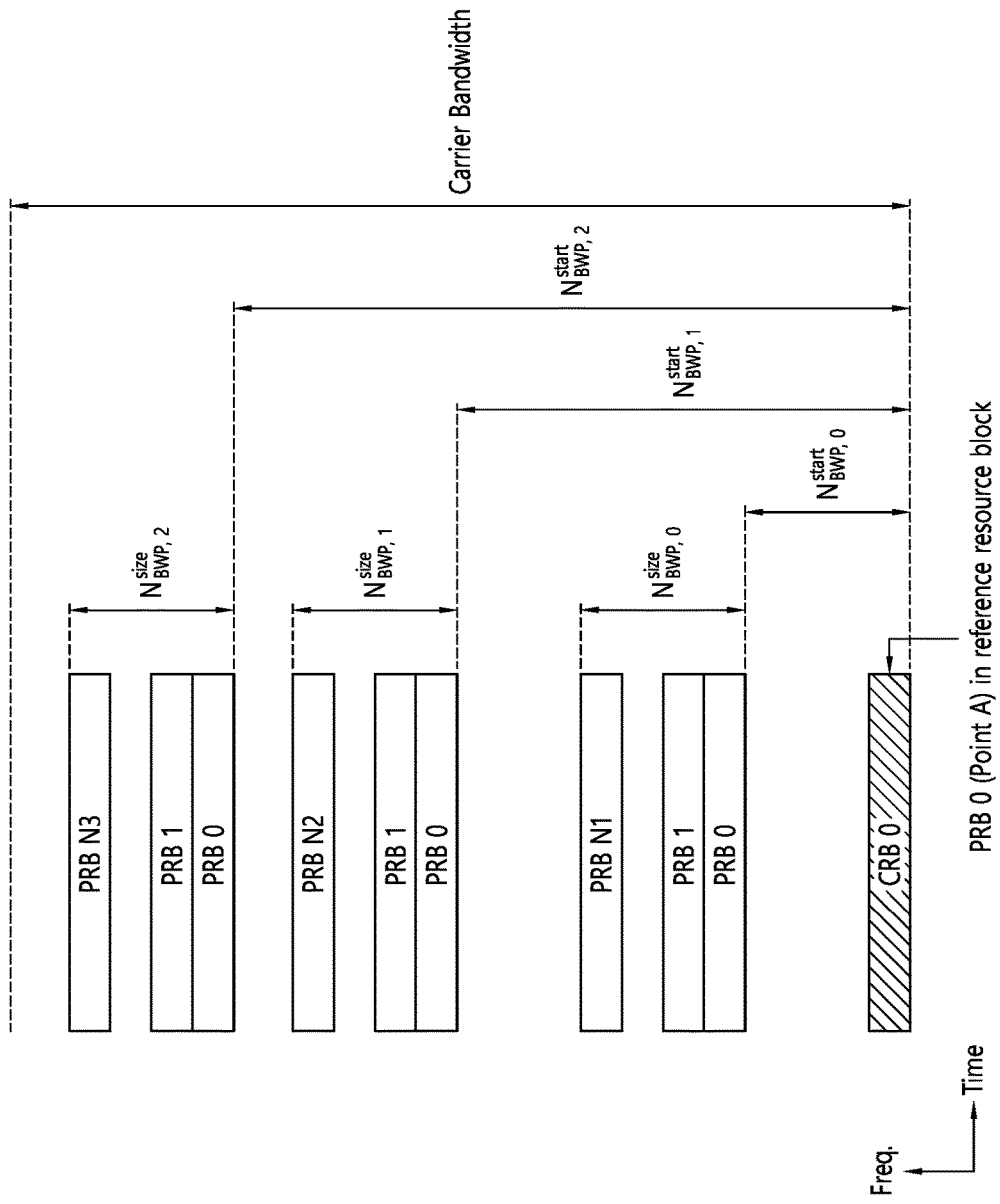
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

FIG. 8 shows a radio protocol architecture for a SL communication, in accordance with an embodiment of the present disclosure. The embodiment of FIG. 8 may be combined with various embodiments of the present disclosure. More specifically, FIG. 8(a) shows a user plane protocol stack, and FIG. 8(b) shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-) configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
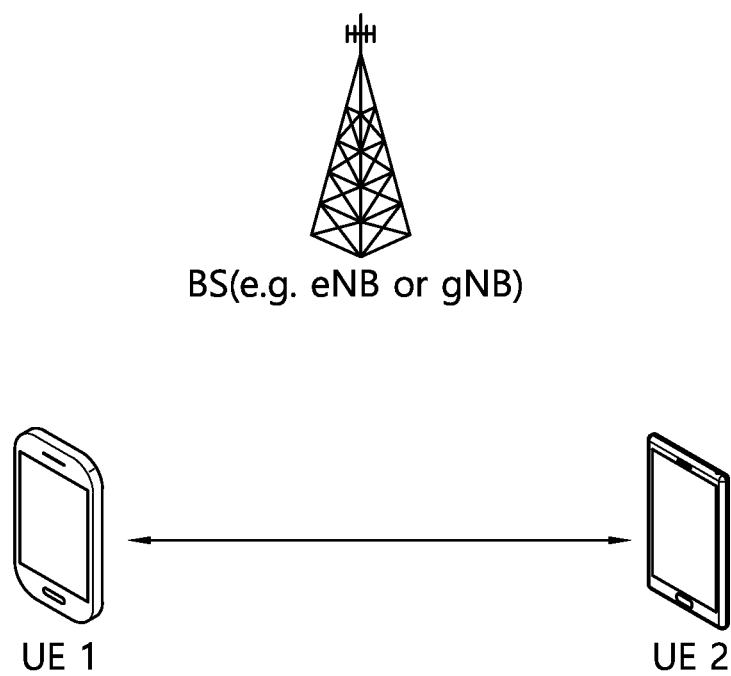
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10:
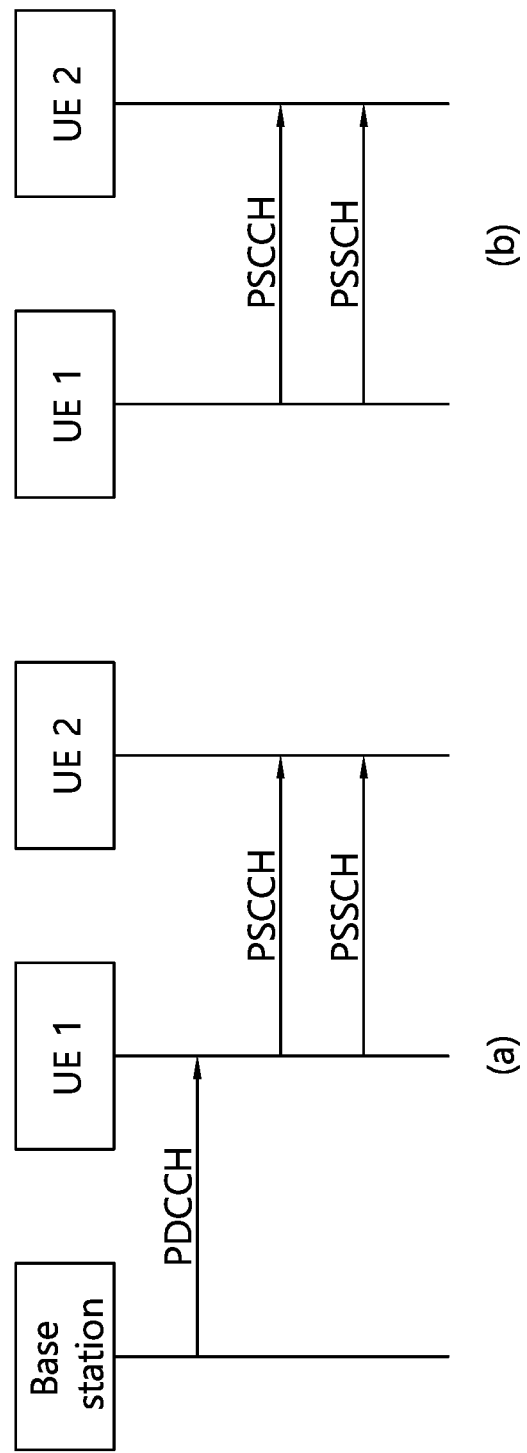
FIG. 10 shows a procedure of performing V2X or SL communication by a UE based on a transmission mode, in accordance with an embodiment of the present disclosure.

FIG. 10 shows a procedure of performing V2X or SL communication by a UE based on a transmission mode, in accordance with an embodiment of the present disclosure. The embodiment of FIG. 10 may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10(a) shows a UE operation related to an LTE transmission mode 1 or an LTE transmission mode 3. Alternatively, for example, FIG. 10(a) shows a UE operation related to an NR resource allocation mode 1. For example, the LTE transmission mode 1 may be applied to general SL communication, and the LTE transmission mode 3 may be applied to V2X communication.

For example, FIG. 10(b) shows a UE operation related to an LTE transmission mode 2 or an LTE transmission mode 4. Alternatively, for example, FIG. 10(b) shows a UE operation related to an NR resource allocation mode 2.

Referring to FIG. 10(a), in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10(b), in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11:
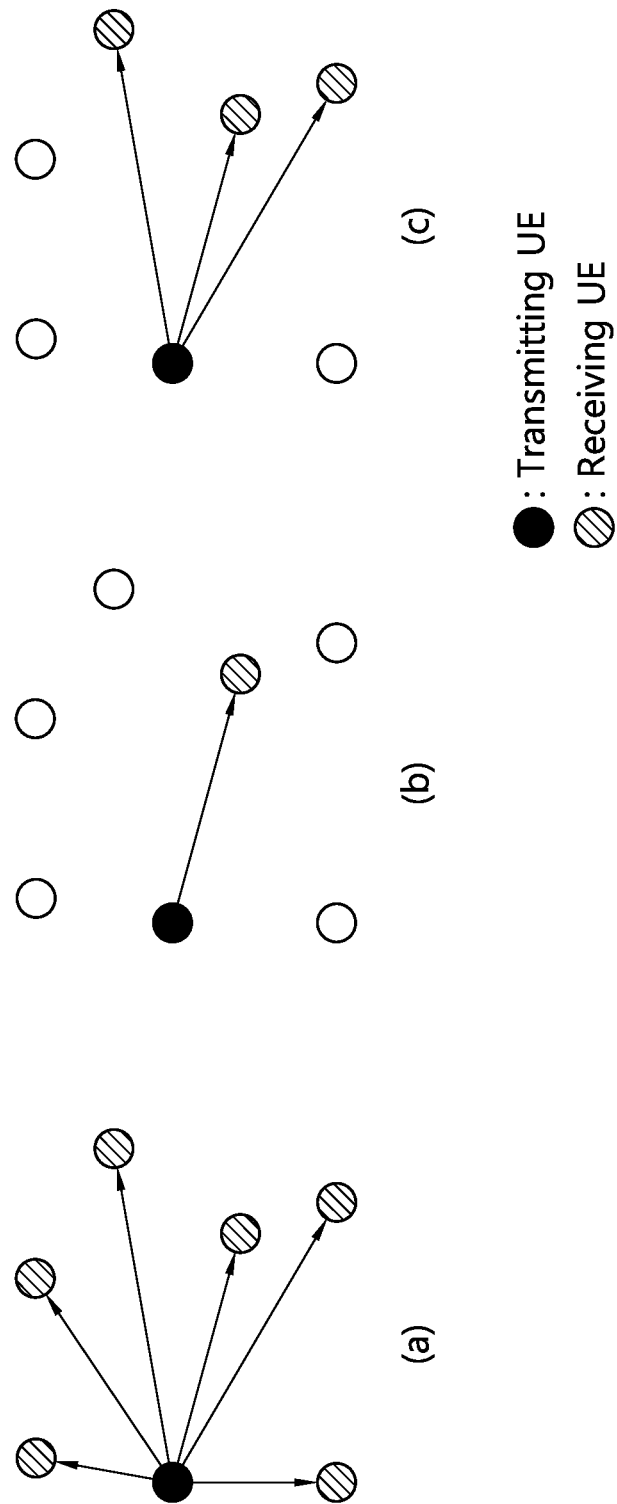
FIG. 11 shows three cast types, in accordance with an embodiment of the present disclosure.

FIG. 11 shows three cast types, in accordance with an embodiment of the present disclosure. The embodiment of FIG. 11 may be combined with various embodiments of the present disclosure. Specifically, FIG. 11(a) shows broadcast-type SL communication, FIG. 11(b) shows unicast type-SL communication, and FIG. 11(c) shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Meanwhile, in order to increase a usage efficiency of resources for data, for the NR system, a form in which resources for a PSCCH are superimposed on resources for a PSSCH or a form in which resources for a PSCCH are surrounded by resources for a PSSCH may be supported.

Figure 12:
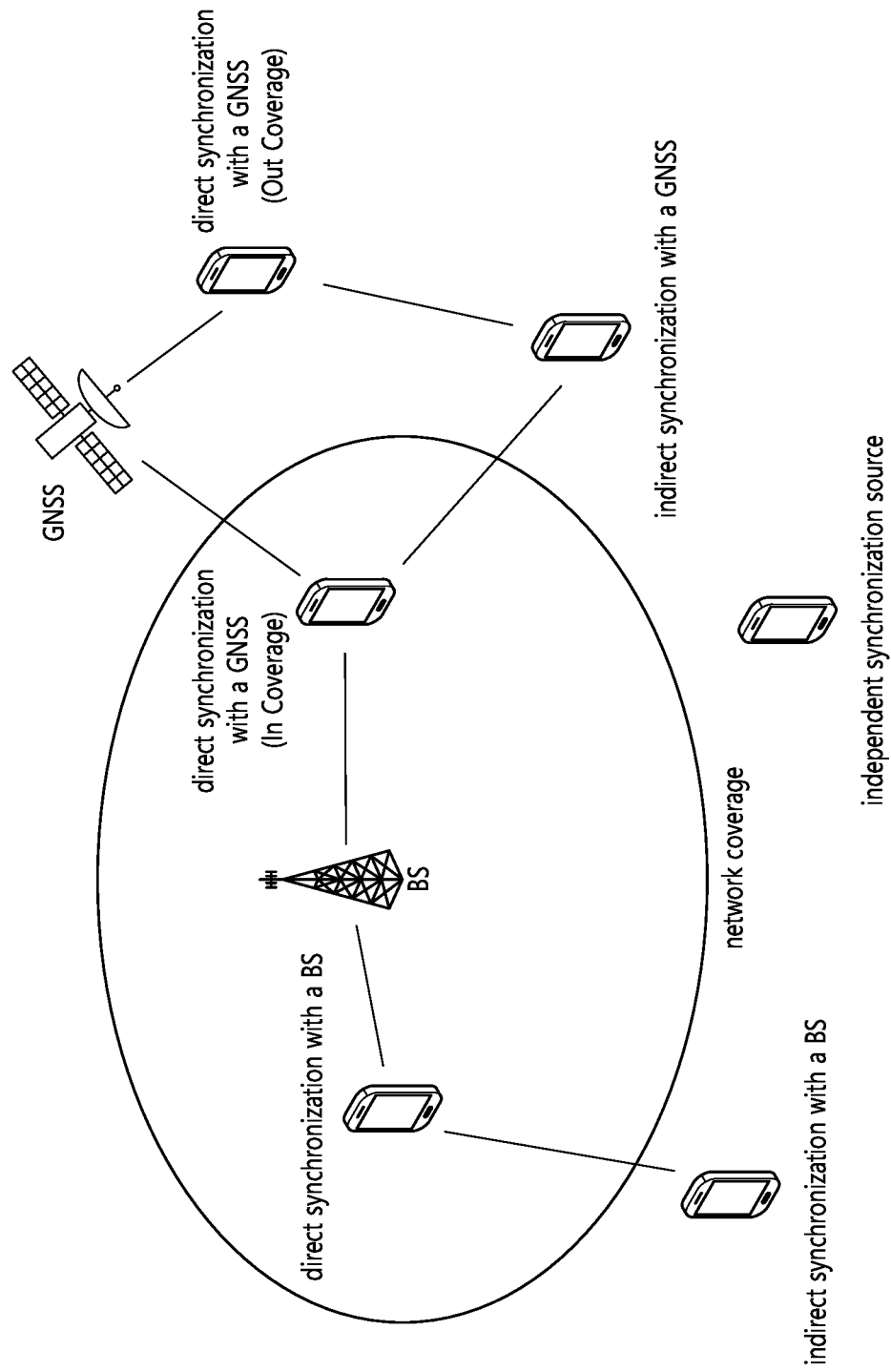
FIG. 12 shows a synchronization source or synchronization reference of V2X based on an embodiment of the present disclosure.

FIG. 12 shows a synchronization source or synchronization reference of V2X based on an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre-)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre-)configured. In a single-carrier operation, the UE may derive transmission timing of the UE from an available synchronization reference having the highest priority.

Meanwhile, in order to increase a usage efficiency of resources for data, for the NR system, a form in which resources for a PSCCH are superimposed on resources for a PSSCH or a form in which resources for a PSCCH are surrounded by resources for a PSSCH may be supported.

Figure 13:
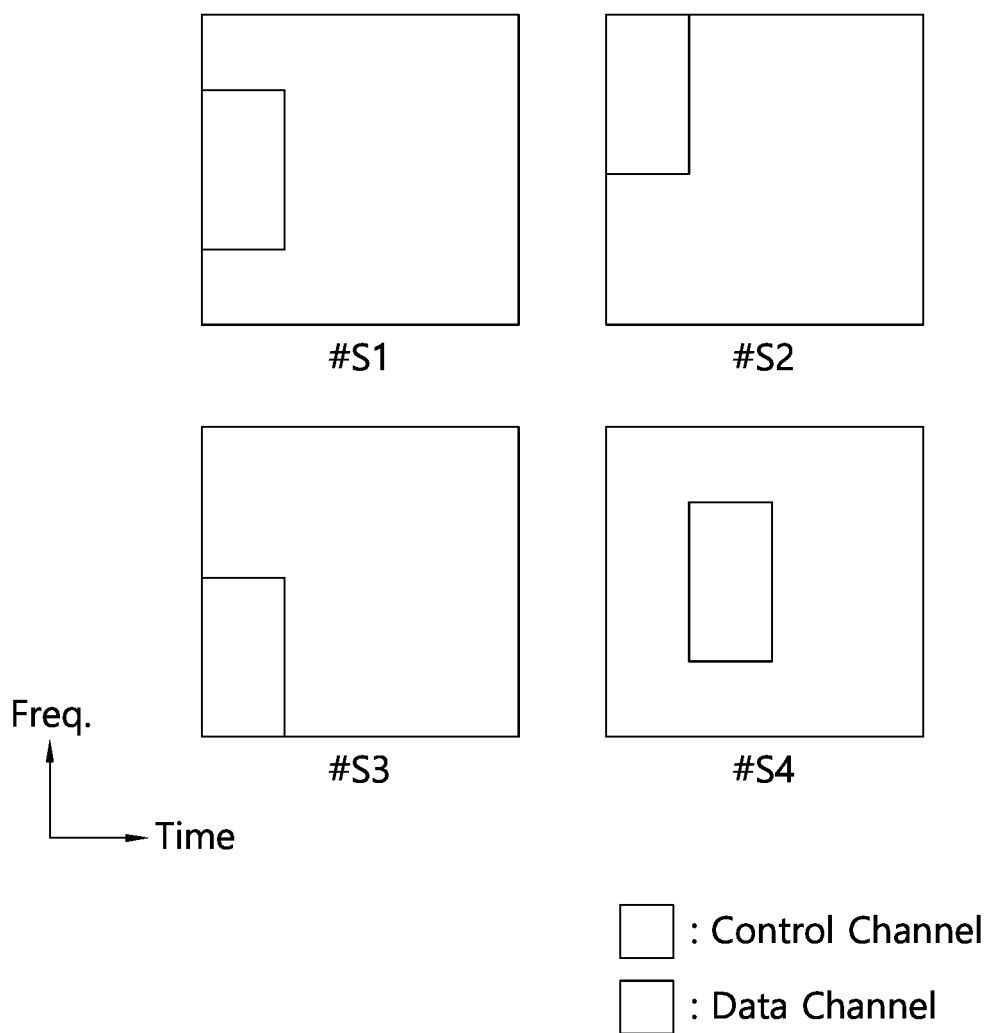
FIG. 13 shows an example of resource allocation for a data channel or a control channel based on an embodiment of the present disclosure.

FIG. 13 shows an example of resource allocation for a data channel or a control channel based on an embodiment of the present disclosure. The embodiment of FIG. 13 may be combined with various embodiments of the present disclosure.

Referring to FIG. 13, resources for a control channel (e.g., PSCCH) may be allocated to the UE in a form (#S1, #S2, #S3) superimposed on resources for a data channel (e.g., PSSCH). Alternatively, resources for a control channel (e.g., PSCCH) may be allocated to the UE in a form (#S4) surrounded by resources for a data channel (e.g., PSSCH).

Meanwhile, the UE may map a DMRS related to a PSSCH or a DMRS for decoding a PSSCH into resources allocated for the PSSCH. For example, the corresponding DMRS may be mapped so as not to overlap with a position of a resource to which the PSCCH is mapped according to a multiplexing scheme of the PSCCH and the PSSCH. For example, the corresponding DMRS may be mapped to a PUSCH resource region so as not to overlap with a position of a resource to which the PSCCH is mapped according to a multiplexing scheme of the PSCCH and the PSSCH.

Figure 14:
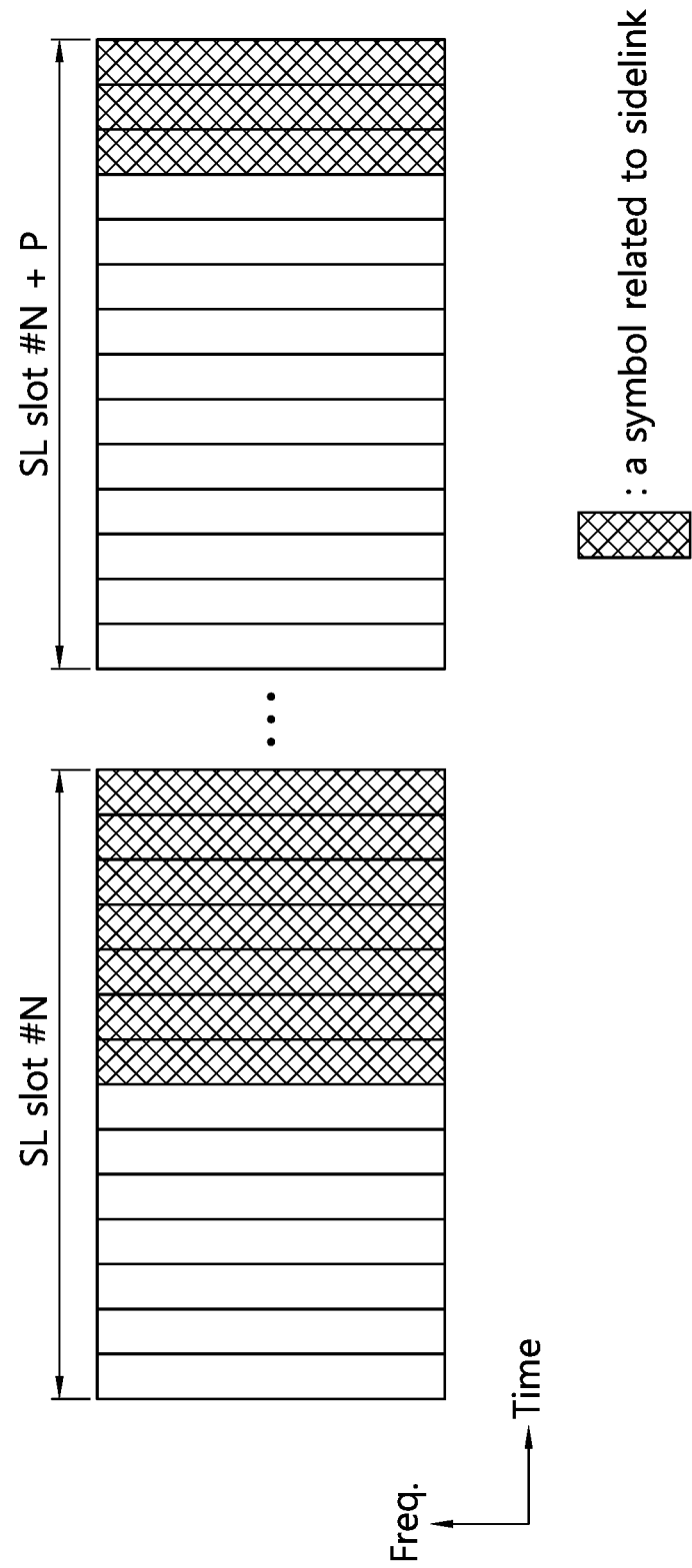
FIG. 14 shows an example of a symbol related to a sidelink in a sidelink slot according to an embodiment of the present disclosure.

FIG. 14 shows an example of a symbol related to a sidelink in a sidelink slot according to an embodiment of the present disclosure. The embodiment of FIG. 14 may be combined with various embodiments of the present disclosure.

A size of a sidelink resource (e.g., the number of symbols capable of SL transmission/reception in one slot) may be different between slots. For example, as a flexible slot format is supported in NR, the size of the sidelink resource may vary between slots. Accordingly, sidelink resources of different sizes for each slot may be allocated to the UE.

For example, referring to FIG. 14, there may be 7 symbols capable of sidelink communication on a SL slot #N, whereas there may be 3 symbols capable of sidelink communication on a SL slot #N+P. Accordingly, a resource allocation method for a PSSCH and/or a mapping position or method of a DMRS related to the PSSCH may vary. In this specification, for convenience of description, a DMRS related to a PSSCH or a DMRS for decoding a PSSCH may be referred to as a PSSCH DMRS. Similarly, a DMRS related to a PDSCH or a DMRS for decoding a PDSCH may be referred to as a PDSCH DMRS, and a DMRS related to a PUSCH or a DMRS for decoding a PUSCH may be referred to as a PUSCH DMRS.

Similarly, in the NR system, the number of symbols or a length of a symbol duration for transmission of a downlink PDSCH and an uplink PUSCH may vary. Accordingly, a position or configuration of a resource through which the DMRS is transmitted may be different according to the length of the symbol duration.

Figure 15:
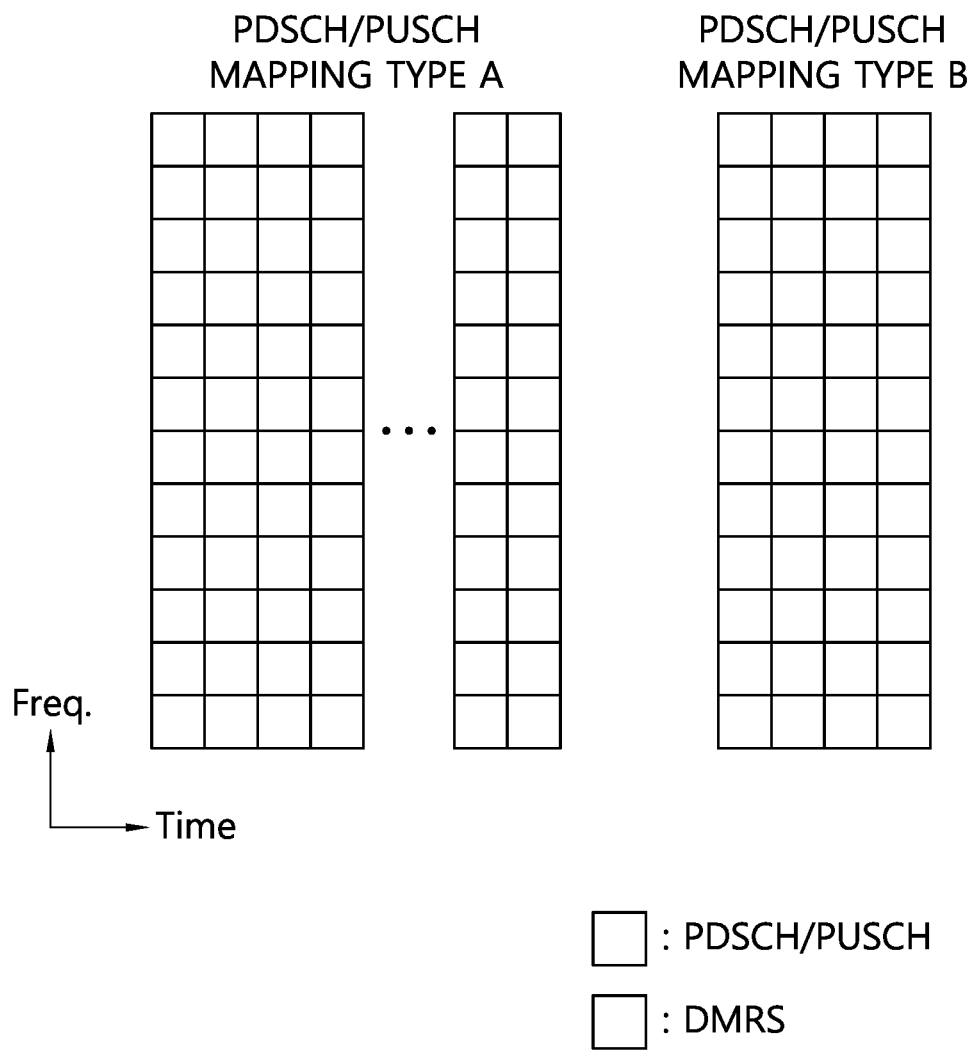
FIG. 15 shows an example of a mapping type A and a mapping type B of a PDSCH or a PUSCH according to an embodiment of the present disclosure.

FIG. 15 shows an example of a mapping type A and a mapping type B of a PDSCH or a PUSCH according to an embodiment of the present disclosure. The embodiment of FIG. 15 may be combined with various embodiments of the present disclosure.

Referring to FIG. 15, for example, in a case of PDSCH mapping type A or PUSCH mapping type A, the PDSCH DMRS or PUSCH DMRS may be mapped to a specific position (e.g., a symbol corresponding to symbol index 2 or 3) based on a slot boundary (e.g., a start point of a slot). And, in the case of PDSCH mapping type A or PUSCH mapping type A, there may be a restriction in that a start symbol of the PDSCH resource must be determined so that the PDSCH resource includes a symbol to which the PDSCH DMRS is mapped, and there may be a restriction in that a start symbol of the PUSCH resource must be determined so that the PUSCH resource includes a symbol to which the PUSCH DMRS is mapped.

For example, in a case of PDSCH mapping type B or PUSCH mapping type B, the PDSCH DMRS or PUSCH DMRS may be mapped to a start symbol of the PDSCH resource allocated for data transmission or a start symbol of the PUSCH resource allocated for data transmission, or the PDSCH DMRS or PUSCH DMRS may be mapped to a specific position based on the start symbol of the PDSCH resource or the start symbol of the PUSCH resource. And, in the case of PDSCH mapping type B or PUSCH mapping type B, since the PDSCH DMRS and the PUSCH DMRS are each mapped to a first symbol of the allocated PDSCH resources or a first symbol of the allocated PUSCH resources, the restrictions on the start symbol of the PDSCH resource or the start symbol of the PUSCH resource may be relatively less compared to the PDSCH mapping type A or the PUSCH mapping type A. For example, in PDSCH mapping type B, a possible length of a PDSCH symbol duration may be limited to 2, 4, or 7 symbols (6 symbols in the case of extended CP). The embodiment of FIG. 15 shows a case in which the length of a PDSCH symbol duration is 4 symbols in PDSCH mapping type B.

In addition, for example, if the PDSCH resources allocated in PDSCH mapping type B overlaps with resources reserved for a search space related to a specific control resource set (CORESET), the first PDSCH DMRS may be reconfigured to be mapped to a symbol immediately following the corresponding CORESET. This method of reconfiguration the mapping position of the PDSCH DMRS may be equally applied even if the allocated PDSCH resources partially overlap CORESET in the frequency domain. Here, for example, CORESET may be a set of time-frequency resources (e.g., a set of at least one resource block and at least one symbol) used for transmitting a DCI through the PDCCH. For example, the CORESET may be transmitted using a portion of a channel bandwidth.

Meanwhile, for example, when a transmitting UE transmits a PSSCH to a receiving UE, in a first symbol of the PSSCH resources, the receiving UE may perform an automatic gain control (AGC) operation. Therefore, when the receiving UE uses the first symbol of the PSSCH resources for AGC operation, if the transmitting UE maps the PSSCH DMRS to the first symbol of the PSSCH resources, the PSSCH detection performance of the receiving UE may decrease.

In addition, for example, as in the embodiment of FIG. 13, the PSCCH may be allocated and/or transmitted in a superimposed form on the PSSCH resources. Meanwhile, a length of a symbol duration of the PSCCH may be relatively larger than a length of a symbol duration of the CORESET for a downlink. In this case, if the transmitting UE does not map the PSSCH DMRS in the PSSCH resource of the PSCCH and FDM (Frequency Division Multiplexing) area, the transmitting UE does not map the PSSCH DMRS in the PSSCH resources of the frequency division multiplexing (FDM) area with the PSCCH, the PSSCH detection performance of the receiving UE may be deteriorated.

Figure 16:
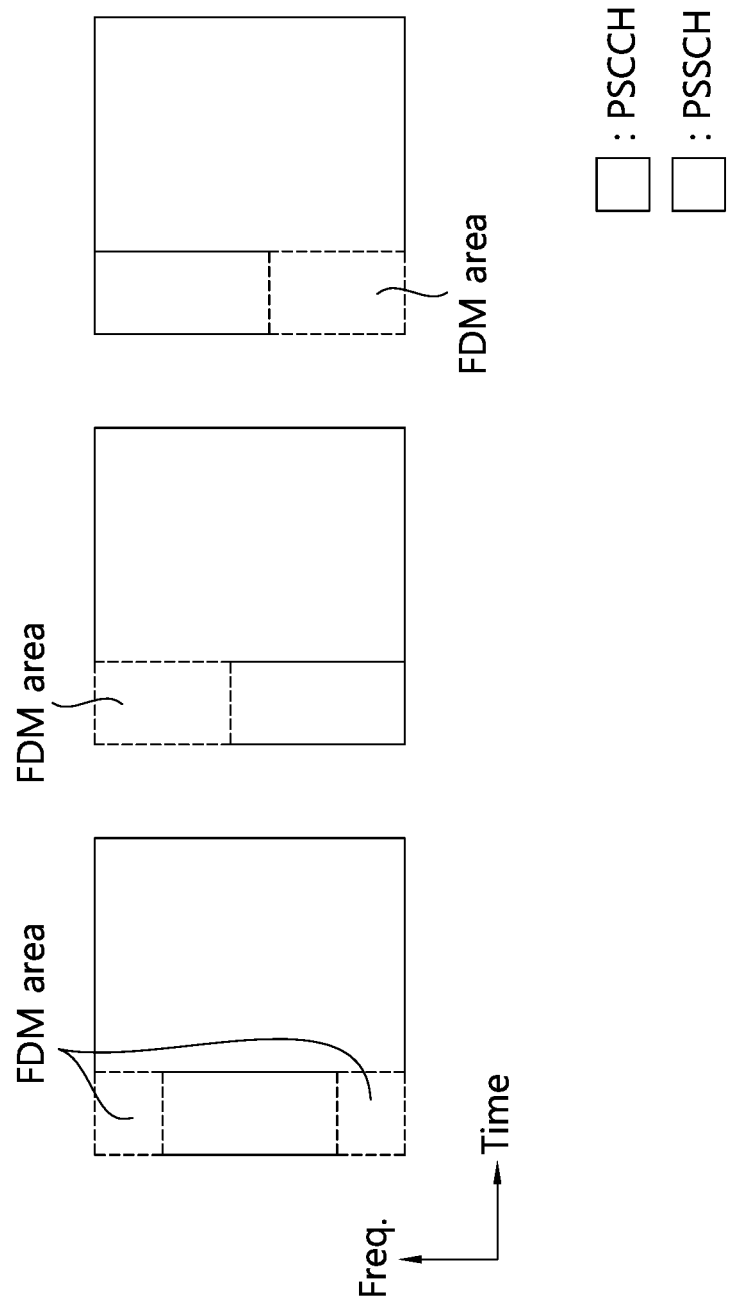
FIG. 16 shows an example of a region in which FDM is performed on a PSCCH and a PSSCH according to an embodiment of the present disclosure.

FIG. 16 shows an example of a region in which FDM is performed on a PSCCH and a PSSCH according to an embodiment of the present disclosure. The embodiment of FIG. 16 may be combined with various embodiments of the present disclosure.

Referring to FIG. 16, a FDM region indicates a region in which FDM is performed for the PSCCH within PSSCH resources. The transmitting UE needs to map a PSSCH DMRS to the resources of the FDM region in order to prevent the receiving UE from deteriorating a detection performance of the PSSCH. That is, in sidelink communication, in order for the transmitting UE to efficiently transmit data to the receiving UE, the transmitting UE needs to determine resources for a PSSCH and/or resources for mapping a PSSCH DMRS. Hereinafter, a method for determining resources for mapping a PSSCH DMRS and an apparatus supporting the same will be described according to various embodiments of the present disclosure.

Figure 17:
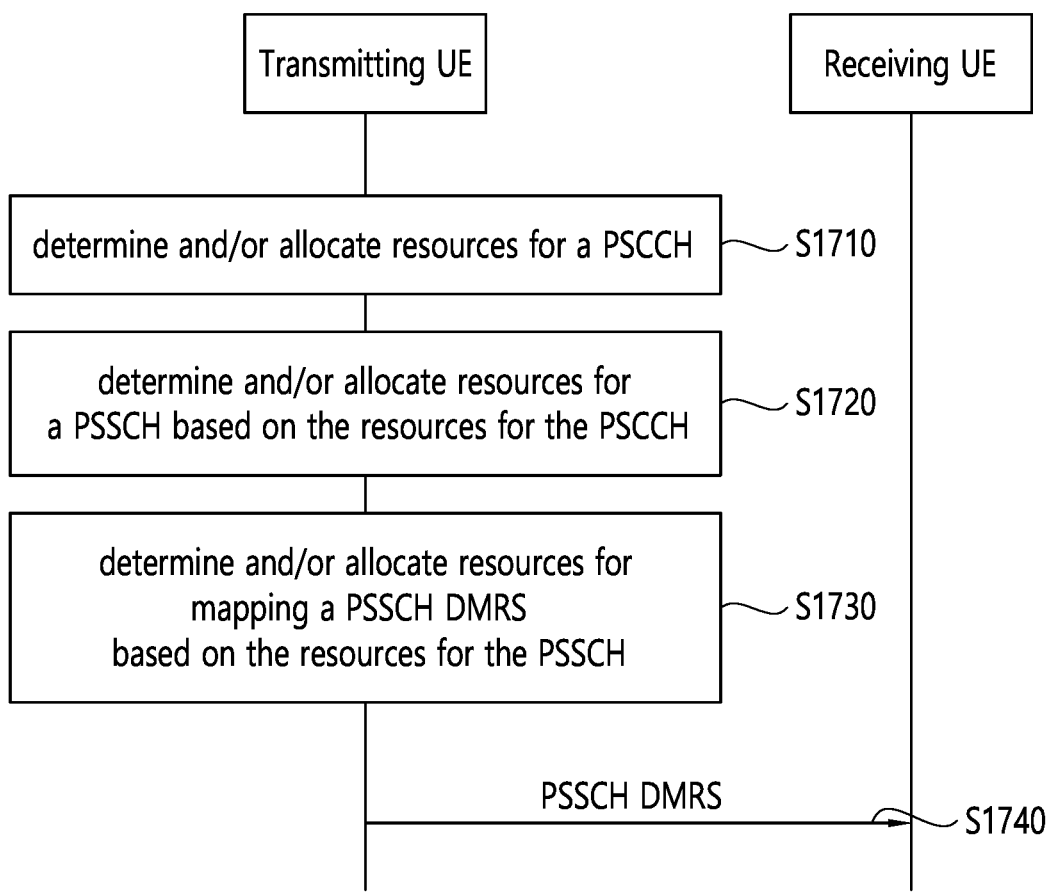
FIG. 17 shows a procedure in which a transmitting terminal that has determined and/or allocated resources for a PSSCH DMRS performs sidelink communication with a receiving terminal, according to an embodiment of the present disclosure.

FIG. 17 shows a procedure in which a transmitting UE that has determined and/or allocated resources for a PSSCH DMRS performs sidelink communication with a receiving UE, according to an embodiment of the present disclosure. The embodiment of FIG. 17 may be combined with various embodiments of the present disclosure.

Referring to FIG. 17, in step S1710, the transmitting UE may determine and/or allocate resources for a PSCCH.

According to an embodiment of the present disclosure, the transmitting UE may determine position information of a PSSCH DMRS based on position information of a PUSCH DMRS (e.g., a position pattern of the PUSCH DMRS). More specifically, the position information of the PSSCH DMRS may be determined based on Table 7 or Table 8 related to the position information of the PUSCH DMRS. For example, in a single-symbol DMRS structure (i.e., when a duration for one DMRS is one symbol), the position of the PSSCH DMRS may be determined based on Table 7. For example, in a double-symbol DMRS structure (i.e., when a duration for one DMRS is two symbols), the position of the PSSCH DMRS may be determined based on Table 8. In addition, if resources for the sidelink in a slot is variable, the PSSCH DMRS structure may be determined based on the PUSCH mapping type B.

TABLE 7

| $l_d$ in symbols | DM-RS positions i | | | | | | | |
|---|---|---|---|---|---|---|---|---|
| | PUSCH mapping type A dmrs-AdditionalPosition | | | | PUSCH mapping type B dmrs-AdditionalPosition | | | |
| | 0 | 1 | 2 | 3 | 0 | 1 | 2 | 3 |
| <4 | — | — | — | — | $l_0$ | $l_0$ | $l_0$ | $l_0$ |
| 4 | $l_0$ | $l_0$ | $l_0$ | $l_0$ | $l_0$ | $l_0$ | $l_0$ | $l_0$ |
| 5 | $l_0$ | $l_0$ | $l_0$ | $l_0$ | $l_0$ | $l_0$, 4 | $l_0$, 4 | $l_0$, 4 |
| 6 | $l_0$ | $l_0$ | $l_0$ | $l_0$ | $l_0$ | $l_0$, 4 | $l_0$, 4 | $l_0$, 4 |
| 7 | $l_0$ | $l_0$ | $l_0$ | $l_0$ | $l_0$ | $l_0$, 4 | $l_0$, 4 | $l_0$, 4 |
| 8 | $l_0$ | $l_0$, 7 | $l_0$, 7 | $l_0$, 7 | $l_0$ | $l_0$, 6 | $l_0$, 3, 6 | $l_0$, 3, 6 |
| 9 | $l_0$ | $l_0$, 7 | $l_0$, 7 | $l_0$, 7 | $l_0$ | $l_0$, 6 | $l_0$, 3, 6 | $l_0$, 3, 6 |
| 10 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 11 | $l_0$ | $l_0$, 9 | $l_0$, 6, 9 | $l_0$, 6, 9 | $l_0$ | $l_0$, 8 | $l_0$, 4, 8 | $l_0$, 3, 6, 9 |
| 12 | $l_0$ | $l_0$, 9 | $l_0$, 6, 9 | $l_0$, 5, 8, 11 | $l_0$ | $l_0$, 10 | $l_0$, 5, 10 | $l_0$, 3, 6, 9 |
| 13 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |
| 14 | $l_0$ | $l_0$, 11 | $l_0$, 7, 11 | $l_0$, 5, 8, 11 | $l_0$ | $l_0$, 10 | $l_0$, 5, 10 | $l_0$, 3, 6, 9 |

TABLE 8

| $l_d$ in symbols | DM-RS positions i | | | | | | | |
|---|---|---|---|---|---|---|---|---|
| | PUSCH mapping type A dmrs-AdditionalPosition | | | | PUSCH mapping type B dmrs-AdditionalPosition | | | |
| | 0 | 1 | 2 | 3 | 0 | 1 | 2 | 3 |
| <4 | — | — | | | — | — | | |
| 4 | $l_0$ | $l_0$ | | | — | — | | |
| 5 | $l_0$ | $l_0$ | | | $l_0$ | $l_0$ | | |
| 6 | $l_0$ | $l_0$ | | | $l_0$ | $l_0$ | | |
| 7 | $l_0$ | $l_0$ | | | $l_0$ | $l_0$ | | |
| 8 | $l_0$ | $l_0$ | | | $l_0$ | $l_0$, 5 | | |
| 9 | $l_0$ | $l_0$ | | | $l_0$ | $l_0$, 5 | | |
| 10 | $l_0$ | $l_0$, 8 | | | $l_0$ | $l_0$, 7 | | |
| 11 | $l_0$ | $l_0$, 8 | | | $l_0$ | $l_0$, 7 | | |
| 12 | $l_0$ | $l_0$, 8 | | | $l_0$ | $l_0$, 9 | | |
| 13 | $l_0$ | $l_0$, 10 | | | $l_0$ | $l_0$, 9 | | |
| 14 | $l_0$ | $l_0$, 10 | | | $l_0$ | $l_0$, 9 | | |

In order to determine the position information of the PSSCH DMRS based on the information of the PUSCH DMRS of Table 7 or Table 8 (e.g., the position pattern of the PUSCH DMRS), it is necessary to define or (pre-)configure a reference point for defining or interpreting $l_d$ and $l_0$. When the position information of the PSSCH DMRS is N, an actual PSSCH DMRS position may be determined as a position after N symbols from the reference point. For example, the $l_d$ may indicate a length of a symbol duration as a reference (hereinafter, referred to as a length of a reference symbol duration). For example, the $l_0$ may indicate the symbol position of the first PSSCH DMRS. For example, the dmrs-AdditionalPosition may indicate the number of PSSCH DMRSs. However, the $l_d$ and the $l_0$ of Table 7 or Table 8 may be separately defined for the PSSCH DMRS.

Figure 18:
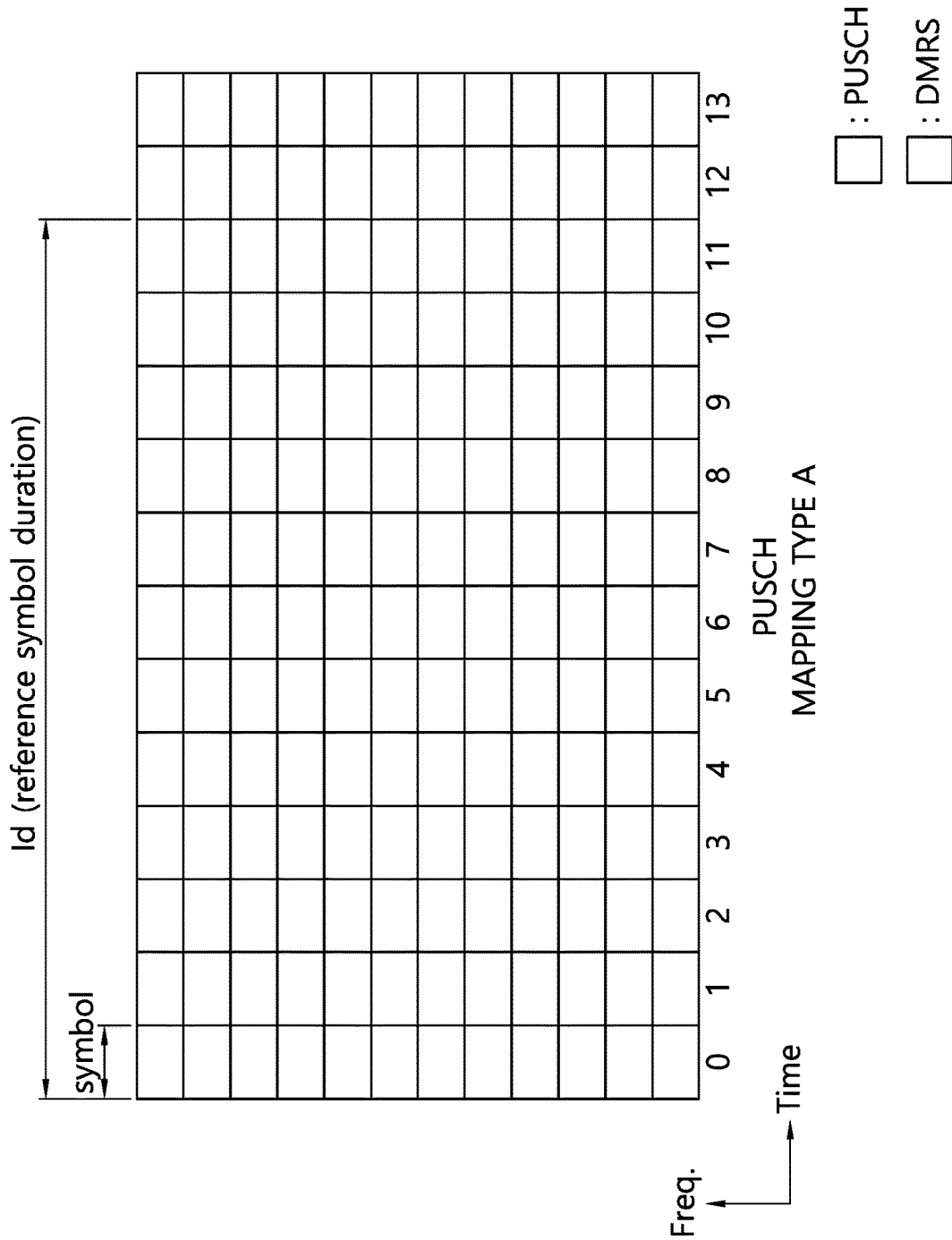
FIG. 18 shows an example in which a DMRS is mapped to PUSCH resources according to an embodiment of the present disclosure.

FIG. 18 shows an example in which a DMRS is mapped to PUSCH resources according to an embodiment of the present disclosure. The embodiment of FIG. 18 may be combined with various embodiments of the present disclosure.

For example, referring to Table 7, in parameters for a position pattern of the PUSCH DMRS, the PUSCH mapping type may be A, the dmrs-AdditionalPosition may be 3, $l_d$ may be 12, and 10 may be 2. In this case, the DMRS may be mapped to symbol indexes 2, 5, 8, and 11, and the pattern in which the DMRS is mapped to the PUSCH resources may be in a form of FIG. 18. Similarly, for example, a position pattern of a PSSCH DMRS may be determined based on the parameters (e.g., $l_d$, $l_0$) for the position pattern of the PUSCH DMRS and the PUSCH mapping type of Tables 7 and 8, and a DMRS may be mapped and transmitted on PSSCH resources based on the position pattern of the PSSCH DMRS. for example, a position pattern of a PSSCH DMRS may be determined based on parameters (e.g., $l_d$, $l_0$) for a position pattern of a PSCCH DMRS and a PSSCH mapping type, defined separately from the parameters for the position pattern of the PUSCH DMRS and the PUSCH mapping type of Tables 7 and 8 above, and a DMRS may be mapped and transmitted on PSSCH resources based on the position pattern of the PSSCH DMRS. for example, a position pattern of a PSSCH DMRS may be determined based on parameters (e.g., $l_d$, $l_0$) for a position pattern of a PSSCH DMRS and a PSSCH mapping type, defined separately from the parameters for the position pattern of the PUSCH DMRS and the PUSCH mapping type of Tables 7 and 8 above, and a DMRS may be mapped and transmitted on PSSCH resources based on the position pattern of the PSSCH DMRS.

Referring to FIG. 17, in step S1720, the transmitting UE may determine and/or allocate resources for a PSSCH based on the resources for the PSCCH. And, in step S 1730, the transmitting UE may determine and/or allocate resources for mapping a PSSCH DMRS based on the resources for the PSSCH.

More specifically, in consideration of the form in which the PSCCH shown in FIG. 13 is superimposed on the PSSCH, the transmitting UE may determine position information of the PSSCH DMRS. To this end, the transmitting UE may divide resources related to the PSSCH into two resource block (RB) groups or sub-channel groups in a frequency dimension.

Figure 19:
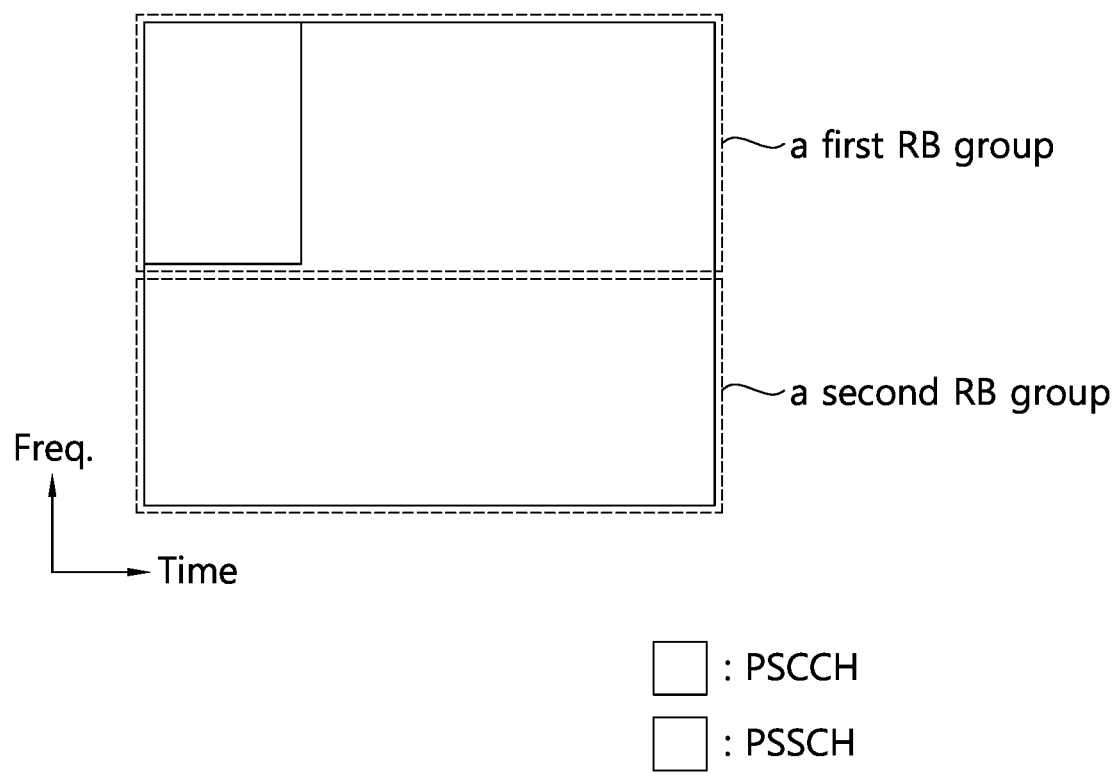
FIG. 19 shows an example in which resources related to a PSSCH are divided into two RB groups or sub-channel groups according to an embodiment of the present disclosure.

FIG. 19 shows an example in which resources related to a PSSCH are divided into two RB groups or sub-channel groups according to an embodiment of the present disclosure. The embodiment of FIG. 19 may be combined with various embodiments of the present disclosure.

Referring to FIG. 19, a first RB group represents a set of RBs in an area in which the PSCCH and the PSSCH are time division multiplexed (TDM) with each other. In addition, a second RB group represents a set of RBs in an area to which only the PSSCH is mapped without the PSCCH. In the present specification, for convenience of description, a set of RBs in an area in which the PSCCH and the PSSCH are time division multiplexed to each other may be referred to as a first RB group, and a set of sub-channels in an area in which PSCCH and PSSCH are time division multiplexed to each other may be referred to as a first sub-channel group. Meanwhile, a set of RBs in an area to which only the PSSCH is mapped without the PSCCH may be referred to as a second RB group, and a set of sub-channels in an area to which only the PSSCH is mapped without the PSCCH may be referred to as a second sub-channel group. Hereinafter, a method for the transmitting UE to divide PSSCH-related resources into a first RB group and a second RB group or a first sub-channel group and a second sub-channel group to determine position information of the PSSCH DMRS will be described.

For example, in the first RB group or the first sub-channel group, a reference point may be (pre-) configured to a symbol immediately following a last symbol to which the PSCCH is mapped. In addition, a reference point may be (pre-) configured to a symbol after a specific offset (e.g., the offset is 1) from a last symbol to which the PSCCH is mapped. Accordingly, it is possible to prevent the PSSCH DMRS from overlapping the PSCCH resources. In this case, a symbol position of the first PSSCH DMRS may be (pre-) configured to 0. Accordingly, the PSSCH DMRS may be directly mapped and transmitted after resources related to PSCCH transmission. In addition, a length of a reference symbol duration may be a length of an interval from the reference point to a last symbol of the allocated PSSCH resources. That is, the length of the reference symbol duration may be less than or equal to the length of the actually allocated PSSCH resources.

For example, in the first RB group or the first sub-channel group, a reference point may be (pre-) configured to a first symbol of sidelink resources in a slot or a first symbol of the allocated PSSCH resources. In this case, a symbol position of the first PSSCH DMRS may be (pre-) configured to a symbol immediately following a last symbol of PSCCH resources. Accordingly, the PSSCH DMRS may be transmitted immediately after resources related to PSCCH transmission. In addition, a length of a reference symbol duration may be a length of an interval from the reference point to a last symbol of the allocated PSSCH resources. Herein, a DMRS mapping to a symbol position preceding the symbol position of the first PSSCH DMRS may be omitted. For example, when a position pattern of a PSSCH DMRS is (pre-) configured to 4 with the symbol position of the first PSSCH DMRS, if the symbol position of the first PSSCH DMRS is greater than 4, the transmitting UE may map a PSSCH DMRS only to the symbol position of the first PSSCH DMRS.

For example, parameters related to a PSSCH DMRS mapping in the second RB group or the second sub-channel group (e.g., a reference point, a symbol position of a first PSSCH DMRS, a length of a reference symbol duration) may be defined or (pre-) configured to be the same as parameters related to the PSSCH DMRS mapping in the above-described the first RB group or the first sub-channel group. In addition, when the transmitting UE maps the PSSCH DMRS in the second RB group or the second sub-channel group, a position of the PSSCH DMRS may be fixed regardless of a position of a RB or a sub-channel.

Figure 20:
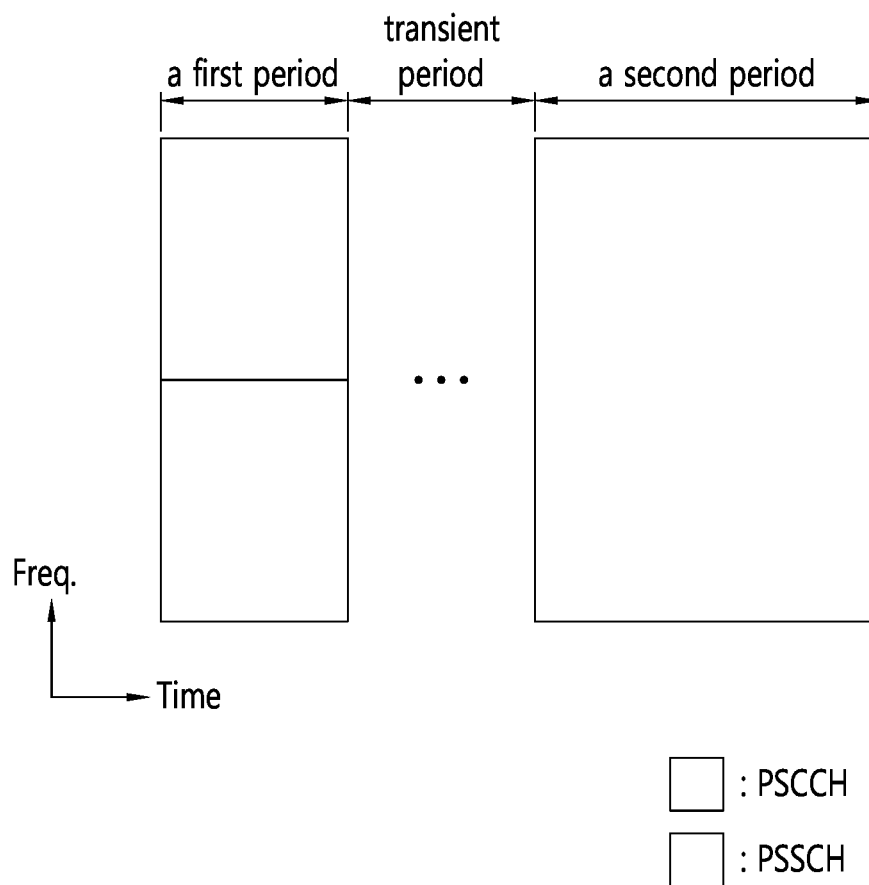
FIG. 20 shows a case in which a transient period exists between a symbol duration in an area in which a PSCCH and a PSSCH are frequency division multiplexed to each other and a symbol duration in an area in which only a PSSCH is transmitted according to an embodiment of the present disclosure.

FIG. 20 shows a case in which a transient period exists between a symbol duration in an area in which a PSCCH and a PSSCH are frequency division multiplexed to each other and a symbol duration in an area in which only a PSSCH is transmitted according to an embodiment of the present disclosure. The embodiment of FIG. 20 may be combined with various embodiments of the present disclosure.

Referring to FIG. 20, a transient period may exist between a symbol duration of an area in which a PSCCH and a PSSCH are frequency division multiplexed (hereinafter, FDMed) to each other (e.g., a first period) and a symbol duration of an area in which only a PSSCH is transmitted (e.g., a second period). For example, between a symbol duration of an area in which a PSCCH and a PSSCH are FDMed to each other (e.g., a first period) and a symbol duration of an area in which only a PSSCH is transmitted (e.g., a second period), when the AGC for the receiving UE is required, a phase continuity may not be guaranteed between the symbol duration of the area in which the PSCCH and the PSSCH are FDMed to each other in a time domain and the symbol duration of the area in which only the PSSCH is transmitted without the PSCCH.

In addition, it may be difficult for the receiving UE to estimate channel information of another symbol duration by using the PSSCH DMRS of a specific symbol duration. For example, it may be difficult for the receiving UE to estimate channel information before a transient period by using the PSSCH DMRS of a symbol duration after the transient period. That is, when a transient period occurs, since characteristics of a RF circuit may be different, a phase may be randomly changed even if the channel environment is not changed before and after the transient period. For this reason, the receiving UE may not be able to accurately estimate the channel before a transient period even if the channel estimation is performed using the PSSCH DMRS transmitted after the transient period.

Accordingly, it may be required for the transmitting UE to map s PSSCH DMRS even in a symbol duration in which the PSCCH and the PSSCH are FDMed to each other (e.g., the FDM area of FIG. 15). In this case, in the second RB group or the second sub-channel group, a reference point may be (pre-)configured to a first symbol of sidelink resources in a slot or a first symbol of allocated PSSCH resources. In this case, a symbol position of the first PSSCH DMRS may be configured to 0, and a length of a reference symbol duration may be a length of a symbol duration from the reference point to a last symbol of the allocated PSSCH resources. In order to avoid a situation in which the PSSCH DMRS is mapped in a symbol (duration) in which the receiving UE performs AGC, in the second RB group or the second sub-channel group, for example, a reference point may be (pre-)configured to a second symbol of sidelink resources in a slot or a next symbol of a last symbol of a symbol duration that can potentially be used for performing AGC of the receiving UE. In this case, for example, a symbol position of the first PSSCH DMRS may be configured to 0. A length of a reference symbol duration may be a length of a symbol duration from the reference point to a last symbol of the allocated PSSCH resources.

For example, in the second RB group or the second sub-channel group, a reference point may be (pre-)configured to a first symbol of sidelink resources in a slot or a first symbol of allocated PSSCH resources. In this case, a symbol position of the first PSSCH DMRS may be (pre-)configured to 1 or a next symbol of a last symbol of a symbol duration that can potentially be used for AGC performance of the receiving UE. A length of a reference symbol duration may be a length of a symbol duration from the reference point to a last symbol of the allocated PSSCH resources.

To configure or determine a position of the PSSCH DMRS, according to reference parameters (for example, a reference point, a symbol position of a first PSSCH DMRS, a length of a reference symbol duration) respectively configured for the first RB group or the first sub-channel group, the transmitting UE may configure and apply a position pattern of the PSSCH DMRS, and may map and transmit the PSSCH DMRS. And, according to reference parameters (for example, a reference point, a symbol position of a first PSSCH DMRS, a length of a reference symbol duration) respectively configured for the second RB group or the second sub-channel group, the transmitting UE may configure and apply a DMRS pattern, and may map and transmit the PSSCH DMRS.

For example, to configure or determine a position of the PSSCH DMRS, according to the same reference parameters (for example, a reference point, a symbol position of a first PSSCH DMRS, a length of a reference symbol duration) for the first RB group and the second RB group, the transmitting UE may (pre-)configure a position pattern of the PSSCH DMRS. Thereafter, for example, the transmitting UE may map and transmit the PSSCH DMRS by applying a different position pattern of the PSSCH DMRS according to each RB group. For example, to configure or determine a position of the PSSCH DMRS, according to the same reference parameters (for example, a reference point, a symbol position of a first PSSCH DMRS, a length of a reference symbol duration) for the first sub-channel group and the second sub-channel group, the transmitting UE may (pre-)configure a position pattern of the PSSCH DMRS. Thereafter, for example, the transmitting UE may map and transmit the PSSCH DMRS by applying a different position pattern of the PSSCH DMRS to each sub-channel group. Herein, for example, a reference point may be (pre-)configured to a first symbol of sidelink resources in a slot or a first symbol of allocated PSSCH resources. For example, a reference point may be (pre-)configured to a second symbol of sidelink resources in a slot or a next symbol of a last symbol of a symbol duration that can potentially be used for AGC of the receiving UE. In this case, for example, a symbol position of the first PSSCH DMRS may be (pre-)configured to 0. For example, a length of a reference symbol duration may be a length of a symbol duration from the PSSCH resource allocated from the reference point to a last symbol. For example, when the transmitting UE applies the position pattern of the PSSCH DMRS to the first RB group or the first sub-channel group, the transmitting UE may map the PSSCH DMRS so as not to overlap the PSCCH resources by applying the position pattern of the PSSCH DMRS based on the reference parameters configured for the first RB group or the first sub-channel group. In addition, when the transmitting UE applies the position pattern of the PSSSCH DMRS to the second RB or the second sub-channel group, the transmitting UE may map and transmit the PSSCH DMRS to the PSSCH resources by applying the position pattern of the PSSCH DMRS based on the reference parameters configured for the second RB group or the second sub-channel group.

Meanwhile, a position pattern of a PSSCH DMRS may be changed flexibly, and information related to the position pattern of the PSSCH DMRS may be indicated by a SCI indicating a PSSCH resource allocation. For example, the transmitting UE may transmit the information related to the position pattern of the PSSCH DMRS to the receiving UE through the SCI. For example, the transmitting UE may inform or indicate a maximum number of non-contiguous symbols or symbol groups to which the PSSCH DMRS is mapped, to the receiving UE through a SCI. That is, the transmitting UE may transmit information related to a maximum number of non-contiguous symbols or symbol groups to which the PSSCH DMRS is mapped, to the receiving UE through a SCI. For example, referring to Tables 7 and 8, the transmitting UE may inform or indicate the receiving UE of all or part of values (e.g., 0, 1, 2, 3) of a dmrs-AdditionalPosition defined for a PSSCH DMRS through a SCI. For example, candidate values related to the position pattern of the PSSCH DMRS that the transmitting UE can inform to the receiving UE through a SCI may be (pre-)configured for the transmitting UE, and the transmitting UE may inform or indicate the receiving UE of at least one candidate value among the candidate values through a SCI. For example, candidate values related to the position pattern of the PSSCH DMRS may be values related to a dmrs-AdditionalPosition. For example, the receiving UE may determine a position of a time-frequency resource to which the PSSCH DMRS is mapped based on the information related to the position pattern of the PSSCH DMRS received through the SCI and the length of the reference symbol duration. And, the receiving UE may receive the PSSCH DMRS from the transmitting UE at the determined time-frequency resource position. For example, information for PSSCH mapping type A or PSSCH mapping type B may be (pre-) configured for the transmitting UE, and combination candidates combining the information related to the position pattern of the PSSCH DMRS and each PSSCH mapping type may be (pre-) configured for the transmitting UE, the transmitting UE may inform or indicate the receiving UE of at least one combination candidate among the combination candidates through the SCI. That is, the transmitting UE may transmit information (or a value) related to at least one combination candidate among the combination candidates to the receiving UE through the SCI. For example, a value related to the combination candidate combining the information related to the position pattern of the PSSCH DMRS and each mapping type may be {00} when the combination candidate is dmrs-AdditionalPosition=0 and PSSCH mapping type A. For example, a value may be {01} when the combination candidate is dmrs-AdditionalPosition=2 and PSSCH mapping type A. For example, the value may be {10} when the combination candidate is dmrs-AdditionalPosition=2 and PSSCH mapping type B.

For example, the value may be {11} when the combination candidate is dmrs-AdditionalPosition=3 and PSSCH mapping type B.

For example, a value related to a dmrs-AdditionalPosition may be (pre-)configured for the transmitting UE, and the transmitting UE may inform or indicate a length of a reference symbol duration to the receiving UE through a SCI. That is, the transmitting UE may transmit information related to the length of the reference symbol duration to the receiving UE through the SCI. For example, some candidate values related to the length of the reference symbol duration in consideration of an overhead of a SCI may be (pre-)configured for the transmitting UE, and the transmitting UE may inform or indicate the receiving UE of at least one candidate value among the candidate values through the SCI. For example, information for PSSCH mapping type A or PSSCH mapping type B may be (pre-) configured for the transmitting UE, and combination candidates combining the length of the reference symbol duration and each PSSCH mapping type may be (pre-)configured for the transmitting UE, and the transmitting UE may inform or indicate the receiving UE of at least one combination candidate among the combination candidates through the SCI. That is, the transmitting UE may transmit information (or a value) related to at least one combination candidate among the combination candidates to the receiving UE through the SCI. Alternatively, for example, when the length of the reference symbol duration is a length of the actually allocated PSSCH resources, the length of the reference symbol duration may be pre-configured for the UE.

For example, combination candidates combining the dmrs-AdditionalPosition and the length of the reference symbol duration are (pre-)configured for the transmitting UE, and the transmitting UE may inform or indicate the receiving UE of at least one combination candidate among the combination candidates through the SCI. That is, the transmitting UE may transmit information (or a value) related to at least one combination candidate among the combination candidates to the receiving UE through the SCI. For example, a value of the combination candidate combining the dmrs-AdditionalPosition and the length of the reference symbol duration may be {00} when the combination candidate is the dmrs-AdditionalPosition=0 and the $l_d$=5. For example, the value may be {01} when the combination candidate is the dmrs-AdditionalPosition=0 and the $l_d$=8. For example, the value may be {10} when the combination candidate is the dmrs-AdditionalPosition=3 and the $l_d$=8. For example, the value may be {11} when the combination candidate is the dmrs-AdditionalPosition=3 and the $l_d$=13.

For example, information for PSSCH mapping type A or PSSCH mapping type B may be (pre-) configured for the transmitting UE, and combination candidates combining the dmrs-AdditionalPosition, the length of the reference symbol interval, and each PSSCH mapping type may be (pre-) configured for the transmitting UE, and the transmitting UE may inform or indicate the receiving UE of at least one combination candidate among the combination candidates through the SCI. That is, the transmitting UE may transmit information (or a value) related to at least one combination candidate among the combination candidates to the receiving UE through the SCI.

Meanwhile, a single SCI may indicate allocation of a plurality of PSSCH resources. For example, the transmitting UE may indicate a plurality of PSSCH resources to the receiving UE through a single SCI. That is, the transmitting UE may transmit information related to allocation of a plurality of PSSCH resource to the receiving UE through a single SCI. For example, the transmitting UE may allocate initial transmission resources and future retransmission resources. That is, the future retransmission resources may be resources that follows the initial transmission resources in the time domain. Alternatively, for example, the transmitting UE may allocate a plurality of initial transmission resources in advance. In this case, information related to the position pattern of the PSSCH DMRS may be separately indicated for each PSSCH resource. For example, the transmitting UE may separately transmit or indicate the information related to the position pattern of the PSSCH DMRS for each PSSCH resource to the receiving UE through a SCI. For example, when information related to allocation of N PSSCH resources is indicated by a single SCI, information related to position patterns of N PSSCH DMRSs may be indicated together. For example, when the transmitting UE transmits or indicates the receiving UE information related to the allocation of N PSSCH resources through a SCI, the transmitting UE may transmit or indicate the receiving UE together with information related to the position patterns of the N PSSCH DMRSs through the SCI. For example, based on information related to the position pattern of the PSSCH DMRS for each PSSCH resource and/or the length of the reference symbol duration at a time when each PSSCH is transmitted, the transmitting UE may determine a position of a time-frequency resource to which the PSSCH DMRS is mapped. And, for example, based on information related to the position pattern of the PSSCH DMRS for each PSSCH resource and/or the length of the reference symbol duration at a time when each PSSCH is transmitted, the receiving UE may determine a position of a time-frequency resource to which the PSSCH DMRS is mapped. However, in the case of the above method, the SCI overhead may become excessive.

For example, when the transmitting UE transmits information related to a position pattern of one PSSCH DMRS for a plurality of PSSCH resources through a SCI, the position pattern of the actually transmitted PSSCH DMRS at a time each PSSCH is transmitted may be different based on a length of a reference symbol duration at the time the PSSCH is transmitted. For example, the transmitting UE may transmit or indicate information related to the position pattern of one PSSCH DMRS for the plurality of PSSCH resources to the receiving UE through a single SCI, and the receiving UE may determine the position of a PSSCH DMRS mapping resource for the plurality of PSSCH resources indicated by the single SCI based on the information related to the position pattern of the one PSSCH DMRS. For example, based on information related to a position pattern of one PSSCH DMRS for a plurality of PSSCH resources and/or a length of a reference symbol duration at a time when the PSSCH is transmitted, the transmitting UE may determine a position of a time-frequency resource to which the PSSCH DMRS is mapped. For example, based on information related to a position pattern of one PSSCH DMRS for a plurality of PSSCH resources and/or a length of a reference symbol duration at a time when the PSSCH is transmitted, the receiving UE may determine a position of a time-frequency resource to which the PSSCH DMRS is mapped. That is, even when the information related to the position pattern of the PSSCH DMRS is the same for the plurality of PSSCH resources, a location of a time-frequency resource to which an actual PSSCH DMRS is mapped may be different based on a length of a reference symbol duration at a time point at which each PSSCH is transmitted.

For example, combination candidates combining information related to the position pattern of the PSSCH DMRS for each of the plurality of PSSCH resources may be (pre-) configured for the transmitting UE, and the transmitting UE may inform or indicate the receiving UE of at least one combination candidate among the combination candidates through the SCI. That is, the transmitting UE may transmit information (or a value) related to at least one combination candidate among the combination candidates to the receiving UE through the SCI. For example, a value of the combination candidate combining information related to the position pattern of the PSSCH DMRS for each of the plurality of PSSCH resources may be {00} when the combination candidate is dmrs-AdditionalPosition=0 of a first PSSCH and the dmrs-AdditionalPosition=0 of a second PSSCH. For example, the value may be {01} when the combination candidate is dmrs-AdditionalPosition=3 of a first PSSCH and dmrs-AdditionalPosition=0 of a second PSSCH. For example, the value may be {10} when the combination candidate is dmrs-AdditionalPosition=0 of a first PSSCH and dmrs-AdditionalPosition=3 of a second PSSCH. For example, the value may be {11} when the combination candidate is dmrs-AdditionalPosition=3 of a first PSSCH and dmrs-AdditionalPosition=3 of a second PSSCH.

For example, based on information related to the position pattern of the PSSCH DMRS for each PSSCH resource and/or the length of the reference symbol duration at the time when the PSSCH is transmitted, the transmitting UE may determine a position of a time-frequency resource to which the PSSCH DMRS is mapped. For example, the transmitting UE may map the PSSCH DMRS on the determined time-frequency resource and transmit the PSSCH DMRS to the receiving UE. For example, based on information related to the position pattern of the PSSCH DMRS for each PSSCH resource and/or the length of the reference symbol duration at the time when the PSSCH is transmitted, the receiving UE may determine a position of a time-frequency resource to which the PSSCH DMRS is mapped. For example, the receiving UE may receive the PSSCH DMRS from the transmitting UE on the determined time-frequency resource.

Meanwhile, referring to Tables 7 and 8, for example, according to a value of dmrs-AdditionalPosition defined for a PSSCH DMRS or a density of a PSSCH DMRS, a definition or a corresponding value of a reference point, a symbol position 10 of a first PSSCH DMRS, and/or a length $l_d$ of a reference symbol duration may be different. For example, when a value of dmrs-AdditionalPosition is less than or equal to a specific threshold (for example, if a value of dmrs-AdditionalPosition is 1 or 2), a value of $l_0$ may be configured or defined so that a first PSSCH DMRS is mapped after a resource related to PSCCH transmission in a time domain. For example, when a value of dmrs-AdditionalPosition is less than or equal to a specific threshold, the transmitting UE may map the PSSCH DMRS based on a value of $l_0$ configured or defined so that a first PSSCH DMRS is mapped immediately after a resource related to PSCCH transmission, and may transmit the PSSCH DMRS to the receiving UE. Specifically, for example, if an ending symbol index of a PSCCH resource is 3, $l_0$ may be 4 (e.g., when a reference point is a first symbol of a PSSCH resource) or 3 (e.g., when a reference point is a second symbol of a PSSCH resource). On the other hand, if a value of dmrs-AdditionalPosition exceeds a specific threshold, a value of $l_0$ may be defined or configured so that a first PSSCH DMRS is mapped after an AGC symbol or an AGC period in a time domain. For example, if a value of dmrs-AdditionalPosition exceeds a specific threshold, the transmitting UE may map a PSSCH DMRS based on a value of 10 configured or defined so that a first PSSCH DMRS is mapped immediately following an AGC symbol or an AGC period in a time domain, and may transmit the PSSCH DMRS to the receiving UE. Specifically, for example, when an AGC symbol is a first symbol of a PSSCH resource, a value of $l_0$ may be 1 (e.g., when a reference point is a first symbol of a PSSCH resource) or 0 (e.g., when a reference point is a second symbol of a PSSCH resource).

Meanwhile, for example, based on the number of sub-channels, the number of RBs constituting a PSCCH (i.e., the number of RBs included in a PSCCH resource, hereinafter the number of RBs in the PSCCH) and/or the number of sub-channels allocated for the PSSCH, a reference point, a symbol position ($l_0$) of a first PSSCH DMRS, and/or a length ($l_d$) of a reference symbol duration may be defined differently. For example, based on the number of sub-channels, the number of RBs in the PSCCH and/or the number of sub-channels allocated for the PSSCH, a symbol position ($l_0$) of a first PSSCH DMRS, and/or a length ($l_d$) of a reference symbol duration may be different. For example, when the number of RBs in the PSCCH is equal to a sub-channel size or when the number of RBs in the PSCCH is greater than or equal to a specific threshold, a value of $l_0$ may be configured or defined so that a first PSSCH DMRS is mapped after a resource related to the PSCCH transmission in a time domain. In this case, for example, a case in which the number of RBs in the PSCCH is equal to the sub-channel size or a case in which the number of RBs in the PSCCH is equal to or greater than a specific threshold value may include a case in which no RB remains after mapping the PSCCH in the sub-channel (that is, the number of remaining RBs is 0) or a case in which the number of RBs remaining after mapping the PSCCH in the sub-channel is K (e.g., the value of K is 1 or 2) RBs or less. And/or, for example, when the number of sub-channels allocated for the PSSCH is one, a value of $l_0$ may be configured or defined so that a first PSSCH DMRS is mapped after a resource related to PSCCH transmission in a time domain. And/or, for example, when all of symbol positions of the PSSCH DMRS exist within a symbol duration of the PSCCH, a value of $l_0$ may be configured or defined so that to first PSSCH DMRS is mapped after a resource related to PSCCH transmission in a time domain. For example, based on a value of $l_0$ configured or defined so that a first PSSCH DMRS is mapped immediately following a resource related to PSCCH transmission, the transmitting UE may map the PSSCH DMRS and transmit the PSSCH DMRS to the receiving UE. Specifically, for example, if an ending symbol index of a PSCCH resource is 3, the $l_0$ may be 4 (e.g., when a reference point is a first symbol of the PSSCH resource) or 3 (e.g., when a reference point is a second symbol of the PSSCH resource).

Referring to FIG. 17, in step S1740, the transmitting UE may transmit the PSSCH DMRS to the receiving UE. The transmission may include unicast, broadcast or groupcast. For example, the transmitting UE may map the PSSCH DMRS to the PSSCH resource according to various embodiments of the present disclosure.

According to an embodiment of the present disclosure, the transmitting UE may efficiently map and/or transmit the PSSCH DMRS on the PSSCH resource. Accordingly, in terms of the receiving UE, a detection performance of the PSSCH DMRS may be improved, and the receiving UE may efficiently decode the PSSCH.

Figure 21:
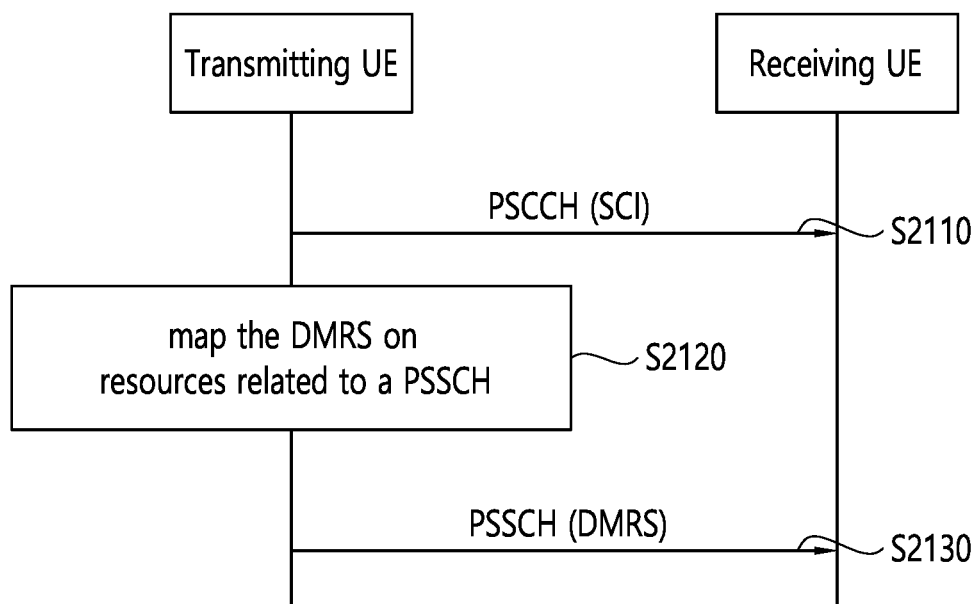
FIG. 21 shows a procedure in which a transmitting terminal transmits a DMRS to a receiving terminal through a PSSCH according to an embodiment of the present disclosure.

FIG. 21 shows a procedure in which a transmitting UE transmits a DMRS to a receiving UE through a PSSCH according to an embodiment of the present disclosure. FIG. 21 may be combined with various embodiments of the present disclosure.

Referring to FIG. 21, in step S2110, the transmitting UE may transmit a SCI to the receiving UE through a PSCCH. For example, the SCI may include information related to a pattern of a DMRS. For example, the information related to the pattern of the DMRS may include information for the number of DMRSs.

In step S2120, the transmitting UE may map the DMRS on resources related to a PSSCH. For example, the transmitting UE may map the DMRS on the resources related to the PSSCH based on the information related to the pattern of the DMRS and a length of a symbol duration of the PSSCH related to the PSCCH. For example, the length of the symbol duration of the PSSCH may be pre-configured for the UE. For example, the length of the symbol duration of the PSSCH related to the PSCCH may include a length of a reference symbol duration described above. For example, the length of the reference symbol duration may be a length of the actually allocated PSSCH resources. For example, a pattern of DMRS mapped on the resources related to the PSSCH may be different according to the length of the symbol duration of the PSSCH and the number of DMRSs.

According to an embodiment of the present disclosure, the transmitting UE may map a first DMRS from a second symbol in a slot related to the PSSCH based on the number of DMRSs exceeding a pre-configured threshold. That is, for example, the transmitting UE may map a first DMRS after an AGC symbol in a slot related to the PSSCH based on the number of DMRSs exceeding a pre-configured threshold. For example, the transmitting UE may map a first DMRS to a next symbol of an AGC symbol in a slot related to the PSSCH based on the number of DMRSs exceeding a pre-configured threshold.

According to an embodiment of the present disclosure, the transmitting UE may map a first DMRS to symbols after a last symbol of the PSCCH based on the number of DMRSs being less than or equal to a pre-configured threshold. For example, the transmitting UE may map a first DMRS to a next symbol of a last symbol of the PSCCH based on the number of DMRSs being less than or equal to a pre-configured threshold. For example, the transmitting UE may map a first DMRS to symbols after a pre-configured offset value from a last symbol of the PSCCH based on the number of DMRSs being less than or equal to a pre-configured threshold. For example, the transmitting UE may map a first DMRS to a next symbol of a last symbol of the PSCCH based on the number of DMRSs being less than or equal to a pre-configured threshold. For example, the pre-configured offset value may be 1.

TABLE 9

| $l_d$ in sym- bols | DM-RS positions i ||||||||
|---|---|---|---|---|---|---|---|---|
| | PSSCH mapping type A dmrs-AdditionalPosition |||| PSSCH mapping type B dmrs-AdditionalPosition ||||
| | 0 | 1 | 2 | 3 | 0 | 1 | 2 | 3 |
| 6 | $l_0$ | $l_0$ | $l_0$ | $l_0$ | $l_0$ | $l_0$, 5 | $l_0$, 5 | $l_0$, 5 |
| 7 | $l_0$ | $l_0$ | $l_0$ | $l_0$ | $l_0$ | $l_0$, 5 | $l_0$, 5 | $l_0$, 5 |
| 8 | $l_0$ | $l_0$ | $l_0$ | $l_0$ | $l_0$ | $l_0$, 5 | $l_0$, 5 | $l_0$, 5 |
| 9 | $l_0$ | $l_0$, 8 | $l_0$, 8 | $l_0$, 7 | $l_0$ | $l_0$, 7 | $l_0$, 4, 7 | $l_0$, 4, 7 |
| 10 | $l_0$ | $l_0$, 8 | $l_0$, 8 | $l_0$, 7 | $l_0$ | $l_0$, 7 | $l_0$, 4, 7 | $l_0$, 4, 7 |
| 11 | $l_0$ | $l_0$, 10 | $l_0$, 7, 10 | $l_0$, 7, 10 | $l_0$ | $l_0$, 9 | $l_0$, 5, 9 | $l_0$, 4, 7, 10 |
| 12 | $l_0$ | $l_0$, 10 | $l_0$, 7, 10 | $l_0$, 7, 10 | $l_0$ | $l_0$, 9 | $l_0$, 5, 9 | $l_0$, 4, 7, 10 |
| 13 | $l_0$ | $l_0$, 10 | $l_0$, 7, 10 | $l_0$, 6, 9, 12 | $l_0$ | $l_0$, 11 | $l_0$, 6, 11 | $l_0$, 4, 7, 10 |

More specifically, Table 9 above may indicate a pattern of a DMRS mapped on resources related to a PSSCH based on a length of a symbol duration of the PSSCH, the PSSCH mapping type, and dmrs-AdditionalPosition (e.g., the number of DMRSs). For example, the $l_d$ value may be a length of a symbol duration of the actually allocated PSSCH including an AGC symbol. For example, the value $l_0$ may be a symbol index in a slot related to the PSSCH to which a first DMRS is mapped. For example, Table 9 may be a table showing a position of a DMRS mapped on resources related to a PSSCH by symbol index values in a slot related to the PSSCH including an AGC symbol based on a length of the symbol duration of the PSSCH, the PSSCH mapping type, and dmrs-AdditionalPosition (e.g., the number of DMRSs). For example, a symbol mapped to symbol index 0 in Table 9 may be an AGC symbol.

For example, referring to Table 9, when a value of dmrs-AdditionalPosition is less than or equal to a pre-configured threshold value (e.g., 1), the transmitting UE may map a first PSSCH DMRS to resources after resources related to PSCCH transmission in a time domain. For example, when a value of dmrs-AdditionalPosition is 1 and the PSSCH mapping type is A, the transmitting UE may determine a value $l_0$ based on a length of a symbol duration of the PSCCH. For example, when the length of the symbol duration of the PSCCH is 2, the transmitting UE may determine a value $l_0$ to be 3 so that a first DMRS is located after an AGC symbol included in the symbol duration of the PSSCH. For example, when a value of dmrs-AdditionalPosition is 1, a length of a symbol duration of the PSSCH is 9, and the PSSCH mapping type is A, the transmitting UE may map a PSSCH DMRS to symbol index 3 and symbol index 8 in a slot related to the PSSCH.

For example, referring to Table 9, when a value of dmrs-AdditionalPosition exceeds a pre-configured threshold value (e.g., 1), the transmitting UE may map a first PSSCH DMRS to a symbol immediately following an AGC symbol in a slot related to the PSSCH. For example, when a value of dmrs-AdditionalPosition is 2 and a PSSCH mapping type is B, a value of $l_0$ may be determined to be 1. That is, for example, the transmitting UE may determine a value $l_0$ to be 1 so that a first DMRS is located after an AGC symbol in a slot related to the PSSCH. For example, when a value of dmrs-AdditionalPosition is 2, a length of a symbol duration of the PSSCH is 9, and the PSSCH mapping type is B, the transmitting UE may map a PSSCH DMRS to symbol index 1, symbol index 4, and symbol index 8 in a slot related to the PSSCH.

TABLE 10

| $l_d$ in symbols | DM-RS positions i | | | | | |
|---|---|---|---|---|---|---|
| | PSSCH duration 2 symbols Number of PSSCH DM-RS | | | PSSCH duration 3 symbols Number of PSSCH DM-RS | | |
| | 2 | 3 | 4 | 2 | 3 | 4 |
| 6 | 1, 5 | | | 1, 5 | | |
| 7 | 1, 5 | | | 1, 5 | | |
| 8 | 1, 5 | | | 1, 5 | | |
| 9 | 3, 8 | 1, 4, 7 | | 4, 8 | 1, 4, 7 | |
| 10 | 3, 8 | 1, 4, 7 | | 4, 8 | 1, 4, 7 | |
| 11 | 3, 10 | 1, 5, 9 | 1, 4, 7, 10 | 4, 10 | 1, 5, 9 | 1, 4, 7, 10 |
| 12 | 3, 10 | 1, 5, 9 | 1, 4, 7, 10 | 4, 10 | 1, 5, 9 | 1, 4, 7, 10 |
| 13 | 3, 10 | 1, 6, 11 | 1, 4, 7, 10 | 4, 10 | 1, 6, 11 | 1, 4, 7, 10 |

For example, referring to Table 10, the transmitting UE may determine a pattern of a DMRS mapped on resources related to a PSSCH based on a length of a symbol duration of a PSCCH, a length of a symbol duration of the PSSCH, and the number of DMRSs. For example, the transmitting UE may map the DMRS on the resource related to the PSSCH based on Table 10 above. For example, when a length of a symbol duration of the PSCCH is 2, the number of PSSCH DMRSs is 4, and a length of a symbol duration of the PSSCH is 11, the positions of the PSSCH DMRSs may be 1, 4, 7, and 10. For example, the 1, 4, 7, and 10 may represent values of a symbol index in a slot related to the PSSCH. That is, for example, when a length of a symbol duration of the PSCCH is 2, the number of PSSCH DMRSs is 4, and a length of a symbol duration of the PSSCH is 11, the transmitting UE may map the PSSCH DMRS to a second symbol, a fifth symbol, an eighth symbol, and an eleventh symbol in a slot related to the PSSCH. For example, when a length of a symbol duration of the PSCCH is 3, the number of PSSCH DMRSs is 2, and a length of a symbol duration of the PSSCH is 11, the positions of the PSSCH DMRS may be 4 or 10. For example, the 4 and 10 may represent values of a symbol index in a slot related to the PSSCH. That is, for example, when a length of a symbol duration of the PSCCH is 3, the number of PSSCH DMRSs is 2, and a length of a symbol duration of the PSSCH is 11, the transmitting UE may map the PSSCH DMRS to a fifth symbol and an eleventh symbol in a slot related to the PSSCH.

In step S2130, the transmitting UE may transmit the DMRS to the receiving UE through the PSSCH.

Figure 22:
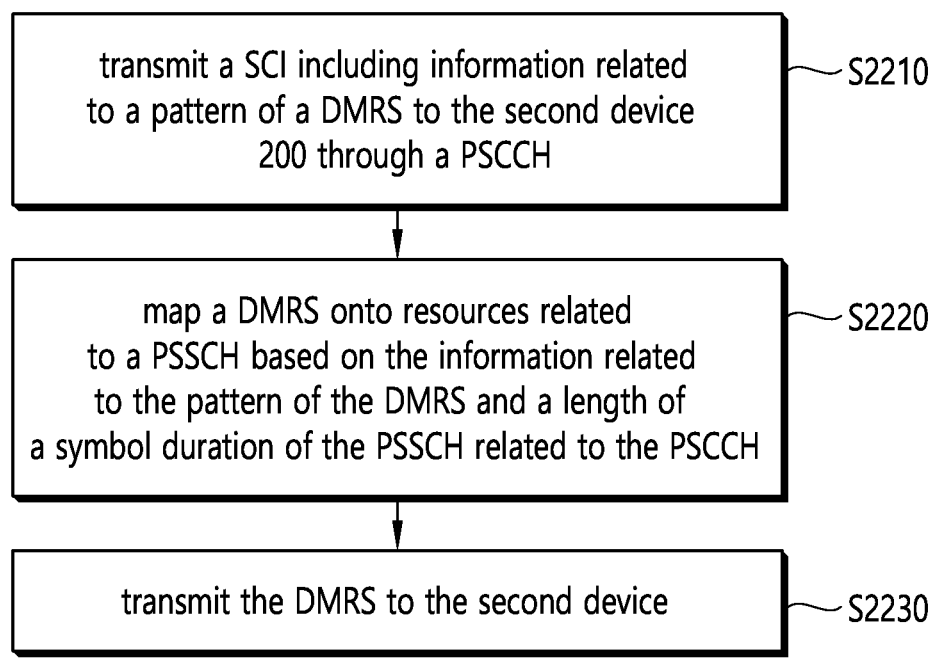
FIG. 22 shows a method in which a first device transmits a DMRS to a second device through a PSSCH according to an embodiment of the present disclosure.

FIG. 22 shows a method in which a first device transmits a DMRS to a second device through a PSSCH according to an embodiment of the present disclosure. FIG. 22 may be combined with various embodiments of the present disclosure.

Referring to FIG. 22, in step S2210, the first device 100 may transmit a sidelink control information (SCI) including information related to a pattern of a demodulation reference signal (DMRS) to the second device 200 through a physical sidelink control channel (PSCCH). For example, the DMRS may be a reference signal for decoding a physical sidelink shared channel (PSSCH). For example, the information related to the pattern of the DMRS may include information for the number of DMRSs.

In step S2220, the first device 100 may map a DMRS onto resources related to a physical sidelink shared channel (PSSCH) based on the information related to the pattern of the DMRS and a length of a symbol duration of the PSSCH related to the PSCCH. For example, the first device 100 may map a first DMRS to a second symbol in a slot related to the PSSCH based on the number of DMRSs exceeding a pre-configured threshold. For example, the first symbol in the slot related to the PSSCH may include an automatic gain control (AGC) symbol. For example, frequency division multiplexing (FDM) may be performed on resources related to the PSCCH and the resources related to the PSSCH. For example, the first device 100 may map the DMRS to the second symbol, a fifth symbol and an eighth symbol in the slot related to the PSSCH based on the length of the symbol duration of the PSSCH being 9 and the number of DMRSs being 3. For example, the first device 100 may map the DMRS to the second symbol, a sixth symbol, and a tenth symbol in the slot related to the PSSCH based on the length of the symbol duration of the PSSCH being 11 and the number of DMRSs being 3. For example, the first device 100 may map the DMRS to the second symbol, a seventh symbol, and a twelfth symbol in the slot related to the PSSCH based on the length of the symbol duration of the PSSCH being 13 and the number of DMRSs being 3. For example, the first device 100 may map the DMRS to the second symbol, a fifth symbol, an eighth and a eleventh symbol in the slot related to the PSSCH based on the length of the symbol duration of the PSSCH being 13 and the number of DMRSs being 4.

For example, the first device 100 may map a first DMRS to symbols after a last symbol of the PSCCH based on the number of DMRSs being less than or equal to a pre-configured threshold. For example, the first device 100 may map a first DMRS to a next symbol of the last symbol of the PSCCH based on the number of DMRSs being less than or equal to a pre-configured threshold. For example, the first device 100 may map a first DMRS to symbols after a pre-configured offset value from a last symbol of the PSCCH based on the number of DMRSs being less than or equal to a pre-configured threshold. For example, the pre-configured offset value may be 1. For example, time division multiplexing (TDM) is performed on resources related to the PSCCH and the resources related to the PSSCH. For example, the first device 100 may map the DMRS to a fourth symbol and a ninth in the slot related to the PSSCH based on the length of the symbol duration of the PSSCH being 9 and the number of DMRSs being 2. For example, the first device 100 may map the DMRS to the second symbol and a sixth symbol in the slot related to the PSSCH based on the length of the symbol duration of the PSSCH being 6 and the number of DMRSs being 2.

In step S2230, the first device 100 may transmit the DMRS to the second device 200 through the PSSCH. For example, the first device 100 may transmit the DMRS mapped onto resources related to the PSSCH to the second device 200 through the PSSCH.

The above-described embodiment may be applied to various devices to be described below. First, for example, the processor 102 of the first device 100 may control the transceiver 106 to transmit to transmit a SCI including information related to the pattern of a DMRS to a second device 200 through a PSCCH. And, for example, the processor 102 of the first device 100 may map a DMRS onto resources related to the PSSCH based on the information related to the pattern of the DMRS and a length of a symbol duration of the PSSCH related to the PSCCH. And, for example, the processor 102 of the first device 100 may control the transceiver 106 to transmit the DMRS to the second device 200 through the PSSCH.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: transmit, to a second device through a physical sidelink control channel (PSCCH), a sidelink control information (SCI) including information related to a pattern of a demodulation reference signal (DMRS), map a DMRS onto resources related to physical sidelink shared channel (PSSCH) based on the information related to the pattern of the DMRS and a length of a symbol duration of the PSSCH related to the PSCCH, and transmit, to the second device through the PSSCH, the DMRS.

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: transmit, to a second UE through a physical sidelink control channel (PSCCH), a sidelink control information (SCI) including information related to a pattern of a demodulation reference signal (DMRS), map a DMRS onto resources related to physical sidelink shared channel (PSSCH) based on the information related to the pattern of the DMRS and a length of a symbol duration of the PSSCH related to the PSCCH, and transmit, to the second UE through the PSSCH, the DMRS.

According to an embodiment of the present disclosure, a non-transitory computer-readable storage medium storing instructions may be provided. For example, the instructions, when executed, cause a first device to: transmit, to a second device through a physical sidelink control channel (PSCCH), a sidelink control information (SCI) including information related to a pattern of a demodulation reference signal (DMRS), map a DMRS onto resources related to physical sidelink shared channel (PSSCH) based on the information related to the pattern of the DMRS and a length of a symbol duration of the PSSCH related to the PSCCH, and transmit, to the second device through the PSSCH, the DMRS.

Figure 23:
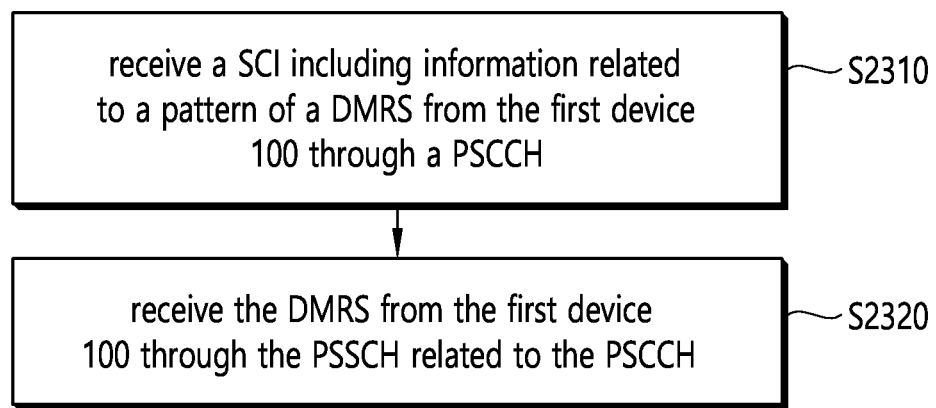
FIG. 23 shows a method for a second device to receive a DMRS from a first device through a PSSCH according to an embodiment of the present disclosure.

FIG. 23 shows a method for a second device to receive a DMRS from a first device through a PSSCH according to an embodiment of the present disclosure. FIG. 23 may be combined with various embodiments of the present disclosure.

Referring to FIG. 23, in step S2310, the second device 200 may receive a SCI including information related to a pattern of a DMRS from the first device 100 through a PSCCH. For example, the DMRS may be a reference signal for decoding the PSSCH. For example, the information related to the pattern of the DMRS may include information for the number of DMRSs.

For example, the DMRS may be mapped onto resources related to the PSSCH based on the information related to the pattern of the DMRS and a length of a symbol duration of the PSSCH related to the PSCCH. For example, a first DMRS may be mapped to a second symbol in a slot related to the PSSCH based on the number of DMRSs exceeding a pre-configured threshold. For example, the first symbol in the slot related to the PSSCH may include an automatic gain control (AGC) symbol. For example, frequency division multiplexing (FDM) may be performed on resources related to the PSCCH and the resources related to the PSSCH. For example, the DMRS may be mapped to the second symbol, a fifth symbol and an eighth symbol in the slot related to the PSSCH based on the length of the symbol duration of the PSSCH being 9 and the number of DMRSs being 3. For example, the DMRS may be mapped to the second symbol, a sixth symbol, and a tenth symbol in the slot related to the PSSCH based on the length of the symbol duration of the PSSCH being 11 and the number of DMRSs being 3. For example, the DMRS may be mapped to the second symbol, a seventh symbol, and a twelfth symbol in the slot related to the PSSCH based on the length of the symbol duration of the PSSCH being 13 and the number of DMRSs being 3. For example, the DMRS may be mapped to the second symbol, a fifth symbol, an eighth and a eleventh symbol in the slot related to the PSSCH based on the length of the symbol duration of the PSSCH being 13 and the number of DMRSs being 4.

For example, a first DMRS may be mapped to symbols after a last symbol of the PSCCH based on the number of DMRSs being less than or equal to a pre-configured threshold. For example, a first DMRS may be mapped to a next symbol of the last symbol of the PSCCH based on the number of DMRSs being less than or equal to a pre-configured threshold. For example, a first DMRS may be mapped to symbols after a pre-configured offset value from a last symbol of the PSCCH based on the number of DMRSs being less than or equal to a pre-configured threshold. For example, the pre-configured offset value may be 1. For example, time division multiplexing (TDM) is performed on resources related to the PSCCH and the resources related to the PSSCH. For example, the DMRS may be mapped to a fourth symbol and a ninth in the slot related to the PSSCH based on the length of the symbol duration of the PSSCH being 9 and the number of DMRSs being 2. For example, the DMRS may be mapped to the second symbol and a sixth symbol in the slot related to the PSSCH based on the length of the symbol duration of the PSSCH being 6 and the number of DMRSs being 2.

In step S2320, the second device 200 may receive the DMRS from the first device 100 through the PSSCH related to the PSCCH. For example, the second device 200 may receive the DMRS mapped on the resources related to the PSSCH from the first device 100 through the PSSCH.

The above-described embodiment may be applied to various devices to be described below. First, for example, the processor 202 of the second device 200 may control the transceiver 206 to receive a SCI including information related to a pattern of a DMRS from the first device 100 through a PSCCH. And, for example, the processor 202 of the second device 200 may control the transceiver 206 to receive the DMRS from the first device 100 through a PSSCH related to the PSCCH.

According to an embodiment of the present disclosure, a second device configured to perform wireless communication may be provided. For example, the second device may comprise: one or more memories storing instructions; one or more transceivers; and one or more processors connected to the one or more memories and the one or more transceivers. For example, the one or more processors may execute the instructions to: receive, from a first device through a physical sidelink control channel (PSCCH), a sidelink control information (SCI) including information related to a pattern of a demodulation reference signal (DMRS), and receive, from the first device through a physical sidelink shared channel (PSSCH) related to the PSCCH, the DMRS. For example, a DMRS is mapped onto resources related the PSSCH based on the information related to the pattern of the DMRS and a length of a symbol duration of the PSSCH related to the PSCCH.

Figure 24:
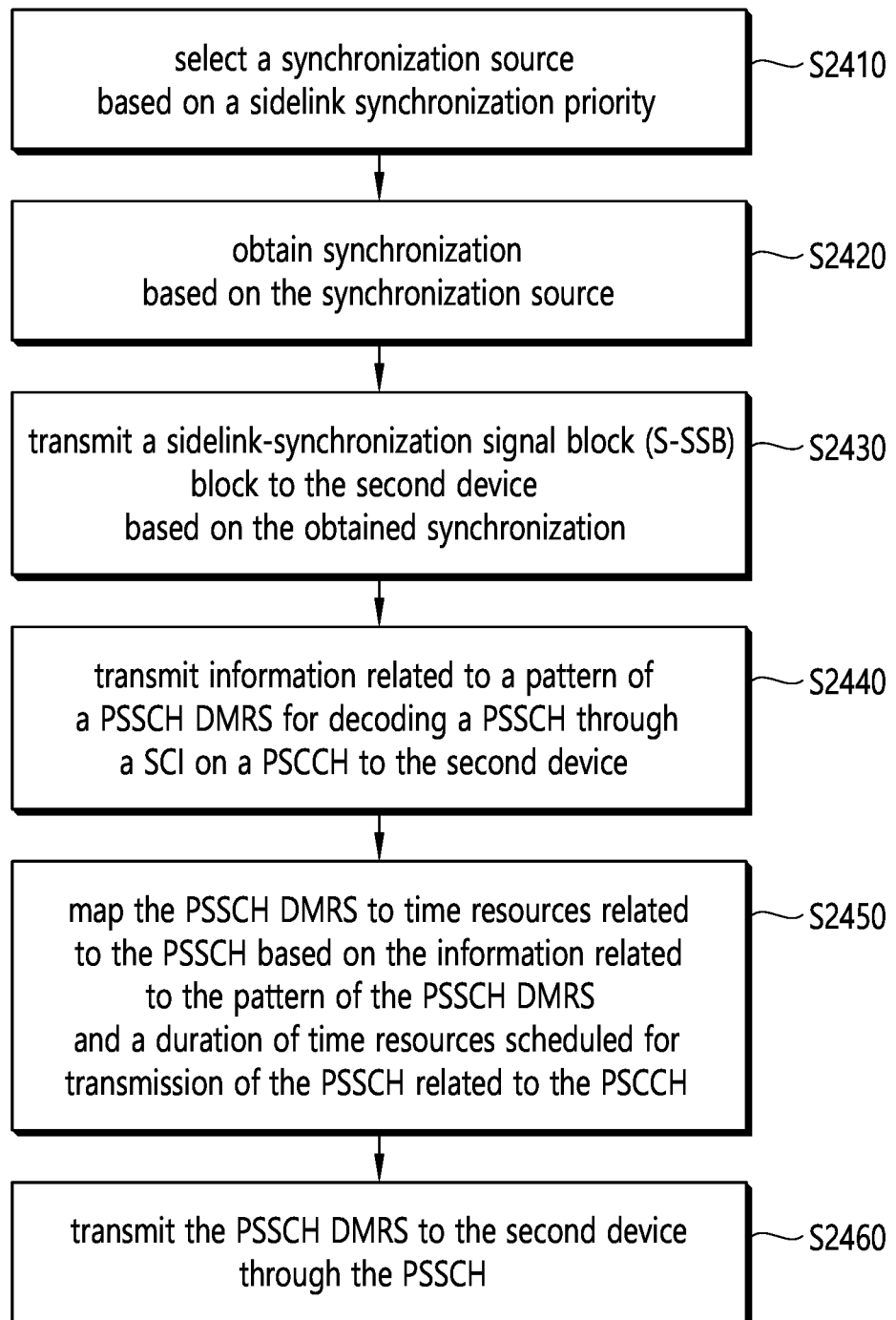
FIG. 24 shows a method in which a first device transmits a PSSCH DMRS to a second device through a PSSCH according to an embodiment of the present disclosure.

FIG. 24 shows a method in which a first device transmits a PSSCH DMRS to a second device through a PSSCH according to an embodiment of the present disclosure. FIG. 24 may be combined with various embodiments of the present disclosure.

Referring to FIG. 24, in step S2410, the first device 100 may select a synchronization source based on a sidelink synchronization priority. For example, the synchronization source may include at least one of a GNSS, a base station, or a terminal. For example, the sidelink synchronization priority may be configured based on Table 5 or Table 6 described above. For example, the sidelink priority may be pre-configured for the first device 100.

In step S2420, the first device 100 may obtain synchronization based on the synchronization source. For example, the first device 100 may perform synchronization with the selected synchronization source.

In step S2430, the first device 100 may transmit a sidelink-synchronization signal block (S-SSB) block to the second device 200 based on the obtained synchronization. For example, the S-SSB block may include a sidelink primary synchronization signal (S-PSS), a sidelink secondary synchronization signal (S-SSS), and a physical sidelink broadcast channel (PSBCH).

In step S2440, the first device 100 may transmit information related to a pattern of a PSSCH DMRS for decoding a PSSCH through a SCI on a PSCCH to the second device 200. For example, the information related to the pattern of the PSSCH DMRS may include information for the number of PSSCH DMRSs.

In step S2450, the first device 100 may map the PSSCH DMRS to time resources related to the PSSCH based on the information related to the pattern of the PSSCH DMRS and a duration of time resources scheduled for transmission of the PSSCH related to the PSCCH. For example, the first device 100 may map a first PSSCH DMRS to a second symbol in a slot related to the PSSCH based on the number of PSSCH DMRSs exceeding a pre-configured threshold. For example, the first symbol of the PSSCH may include an AGC symbol. For example, frequency division multiplexing (FDM) may be performed on resources related to the PSCCH and the resources related to the PSSCH.

For example, the duration of the time resources scheduled for transmission of the PSSCH may be a symbol duration of the PSSCH. For example, the first device 100 may map the PSSCH DMRS to the second symbol, a fifth symbol and an eighth symbol in the slot related to the PSSCH based on the length of the symbol duration of the PSSCH being 9 and the number of PSSCH DMRSs being 3. For example, the first device 100 may map the PSSCH DMRS to the second symbol, a sixth symbol, and a tenth symbol in the slot related to the PSSCH based on the length of the symbol duration of the PSSCH being 11 and the number of PSSCH DMRSs being 3. For example, the first device 100 may map the PSSCH DMRS to the second symbol, a seventh symbol, and a twelfth symbol in the slot related to the PSSCH based on the length of the symbol duration of the PSSCH being 13 and the number of PSSCH DMRSs being 3. For example, the first device 100 may map the PSSCH DMRS to the second symbol, a fifth symbol, an eighth and a eleventh symbol in the slot related to the PSSCH based on the length of the symbol duration of the PSSCH being 13 and the number of PSSCH DMRSs being 4.

For example, the first device 100 may map a first PSSCH DMRS to symbols after a last symbol of the PSCCH based on the number of PSSCH DMRSs being less than or equal to a pre-configured threshold. For example, the first device 100 may map a first PSSCH DMRS to a next symbol of the last symbol of the PSCCH based on the number of PSSCH DMRSs being less than or equal to a pre-configured threshold. For example, the first device 100 may map a first PSSCH DMRS to symbols after a pre-configured offset value from a last symbol of the PSCCH based on the number of PSSCH DMRSs being less than or equal to a pre-configured threshold. For example, the pre-configured offset value may be 1. For example, time division multiplexing (TDM) is performed on resources related to the PSCCH and the resources related to the PSSCH. For example, the first device 100 may map the PSSCH DMRS to a fourth symbol and a ninth in the slot related to the PSSCH based on the length of the symbol duration of the PSSCH being 9 and the number of PSSCH DMRSs being 2. For example, the first device 100 may map the PSSCH DMRS to the second symbol and a sixth symbol in the slot related to the PSSCH based on the length of the symbol duration of the PSSCH being 6 and the number of PSSCH DMRSs being 2.

In step S2460, the first device 100 may transmit the PSSCH DMRS to the second device 200 through the PSSCH. For example, the first device 100 may transmit the PSSCH DMRS mapped onto resources related to the PSSCH to the second device 200 through the PSSCH.

The above-described embodiment may be applied to various devices to be described below. First, for example, the processor 102 of the first device 100 may select a synchronization source based on a sidelink synchronization priority. And, for example, the processor 102 of the first device 100 may obtain synchronization based on the synchronization source. And, for example, the processor 102 of the first device 100 may control the transceiver 106 to transmit a sidelink-synchronization signal block (S-SSB) block to a second device 200 based on the obtained synchronization. And, for example, the processor 102 of the first device 100 may control the transceiver 106 to transmit information related to a pattern of a PSSCH DMRS for decoding a PSSCH through a SCI on a PSCCH to the second device 200. And, for example, the processor 102 of the first device 100 may map the PSSCH DMRS to time resources related to the PSSCH based on the information related to the pattern of the PSSCH DMRS and a duration of time resources scheduled for transmission of the PSSCH related to the PSCCH. And, for example, the processor 102 of the first device 100 may control the transceiver 106 to transmit the PSSCH DMRS to the second device 200 through the PSSCH.

According to an embodiment of the present disclosure, a first device configured to perform wireless communication may be provided. For example, the first device may comprise: one or more memories storing instructions; one or more transceivers; and one or more processors connected to the one or more memories and the one or more transceivers. For example, the one or more processors may execute the instructions to: select a synchronization source based on a sidelink synchronization priority, obtain synchronization based on the synchronization source, transmit a sidelink-synchronization signal block (S-SSB) block to a second device based on the obtained synchronization, transmit information related to a pattern of a PSSCH DMRS for decoding a PSSCH through a SCI on a PSCCH to the second device, map the PSSCH DMRS to time resources related to the PSSCH based on the information related to the pattern of the PSSCH DMRS and a duration of time resources scheduled for transmission of the PSSCH related to the PSCCH, and transmit the PSSCH DMRS to the second device through the PSSCH. For example, the S-SSB block may include a sidelink primary synchronization signal (S-PSS), a sidelink secondary synchronization signal (S-SSS), and a physical sidelink broadcast channel (PSBCH).

According to an embodiment of the present disclosure, an apparatus configured to control a first user equipment (UE) may be provided. For example, the apparatus may comprise: one or more processors; and one or more memories operably connected to the one or more processors and storing instructions. For example, the one or more processors may execute the instructions to: select a synchronization source based on a sidelink synchronization priority, obtain synchronization based on the synchronization source, transmit a sidelink-synchronization signal block (S-SSB) block to a second UE based on the obtained synchronization, transmit information related to a pattern of a PSSCH DMRS for decoding a PSSCH through a SCI on a PSCCH to the second UE, map the PSSCH DMRS to time resources related to the PSSCH based on the information related to the pattern of the PSSCH DMRS and a duration of time resources scheduled for transmission of the PSSCH related to the PSCCH, and transmit the PSSCH DMRS to the second UE through the PSSCH. For example, the S-SSB block may include a sidelink primary synchronization signal (S-PSS), a sidelink secondary synchronization signal (S-SSS), and a physical sidelink broadcast channel (PSBCH).

According to an embodiment of the present disclosure, a non-transitory computer-readable storage medium storing instructions may be provided. For example, the instructions, when executed, cause a first device to: select a synchronization source based on a sidelink synchronization priority, obtain synchronization based on the synchronization source, transmit a sidelink-synchronization signal block (S-SSB) block to a second device based on the obtained synchronization, transmit information related to a pattern of a PSSCH DMRS for decoding a PSSCH through a SCI on a PSCCH to the second device, map the PSSCH DMRS to time resources related to the PSSCH based on the information related to the pattern of the PSSCH DMRS and a duration of time resources scheduled for transmission of the PSSCH related to the PSCCH, and transmit the PSSCH DMRS to the second device through the PSSCH. For example, the S-SSB block may include a sidelink primary synchronization signal (S-PSS), a sidelink secondary synchronization signal (S-SSS), and a physical sidelink broadcast channel (PSBCH).

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 25:
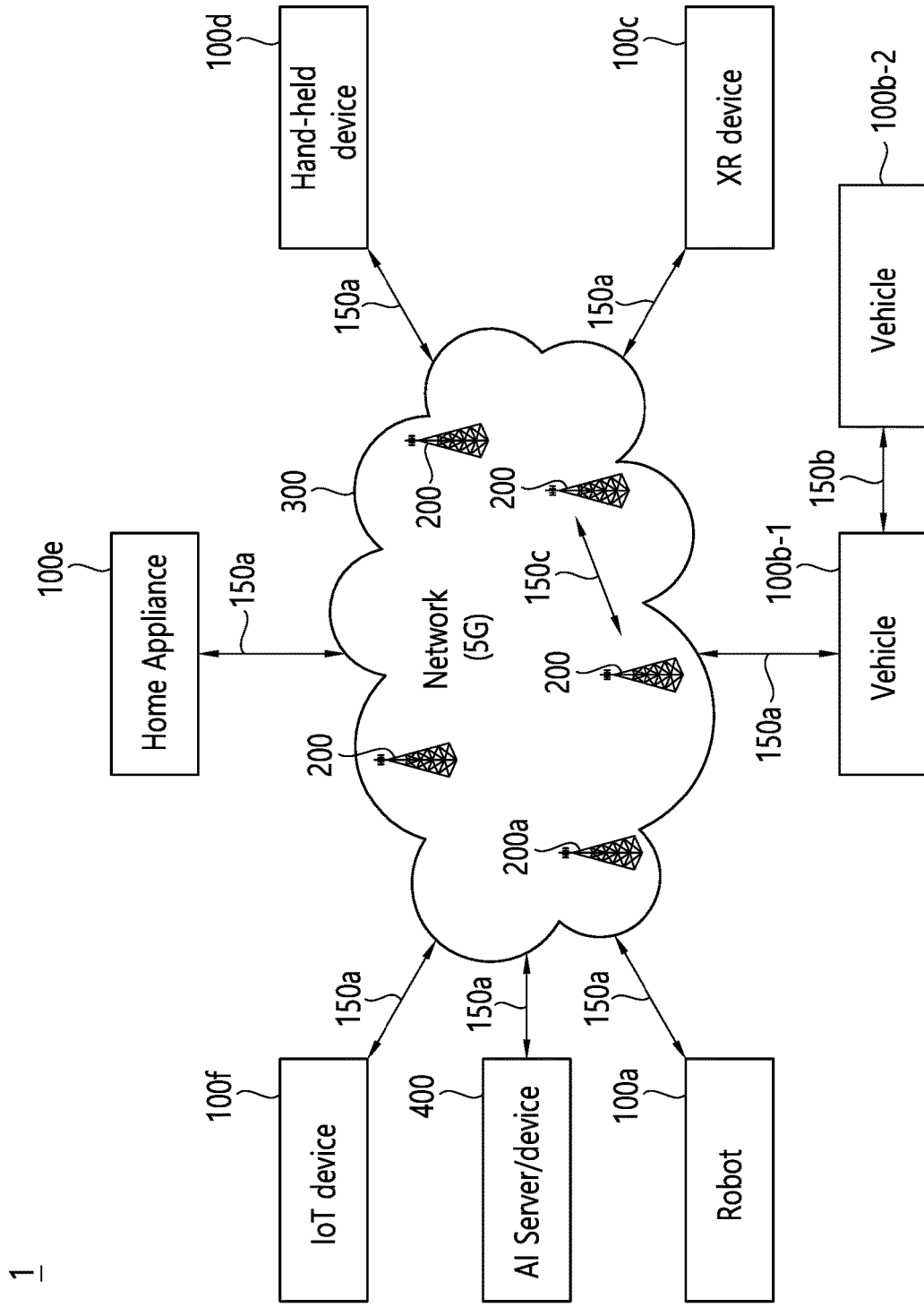
FIG. 25 shows a communication system 1, in accordance with an embodiment of the present disclosure.

FIG. 25 shows a communication system 1, in accordance with an embodiment of the present disclosure.

Referring to FIG. 25, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication(e.g. relay, Integrated Access Backhaul(IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 26:
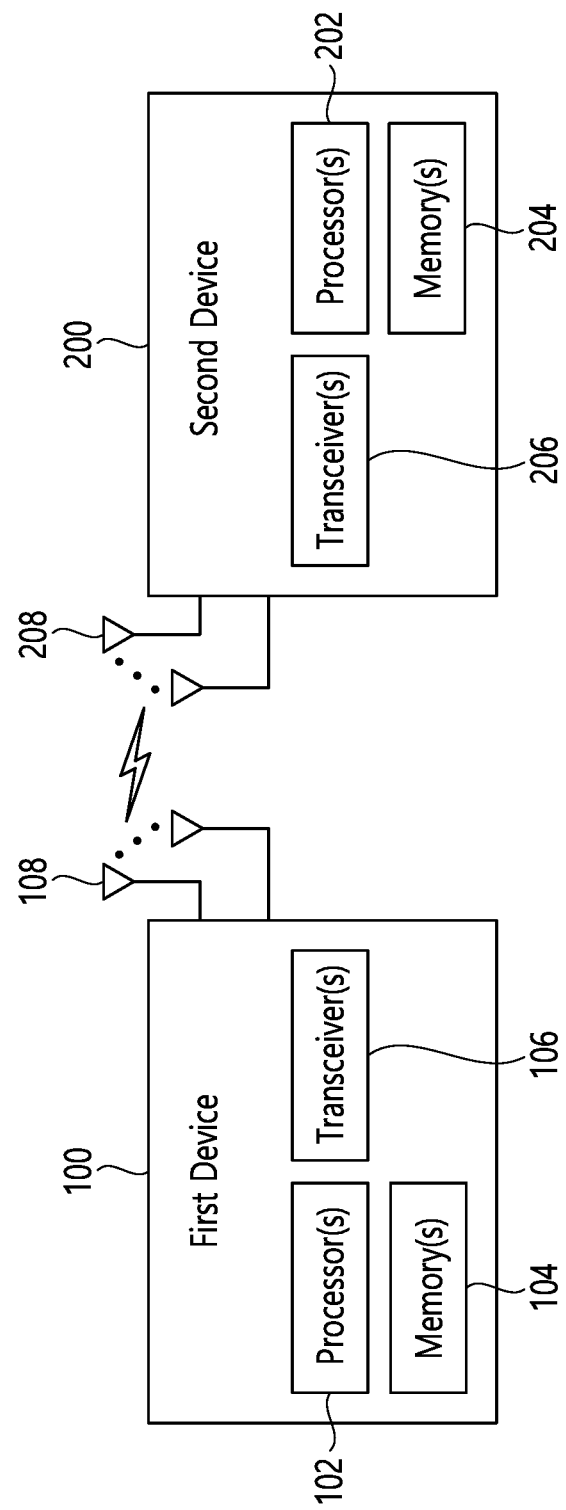
FIG. 26 shows wireless devices, in accordance with an embodiment of the present disclosure.

FIG. 26 shows wireless devices, in accordance with an embodiment of the present disclosure.

Referring to FIG. 26, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 25.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 27:
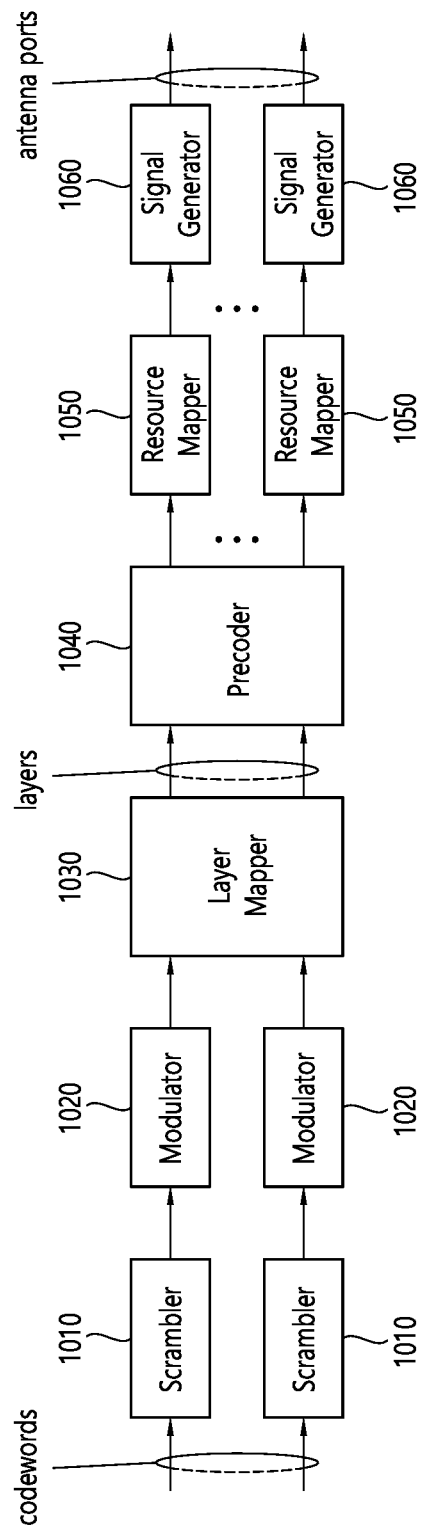
FIG. 27 shows a signal process circuit for a transmission signal, in accordance with an embodiment of the present disclosure.

FIG. 27 shows a signal process circuit for a transmission signal, in accordance with an embodiment of the present disclosure.

Referring to FIG. 27, a signal processing circuit 1000 may include scramblers 1010, modulators 1020, a layer mapper 1030, a precoder 1040, resource mappers 1050, and signal generators 1060. An operation/function of FIG. 27 may be performed, without being limited to, the processors 102 and 202 and/or the transceivers 106 and 206 of FIG. 26. Hardware elements of FIG. 27 may be implemented by the processors 102 and 202 and/or the transceivers 106 and 206 of FIG. 26. For example, blocks 1010 to 1060 may be implemented by the processors 102 and 202 of FIG. 26. Alternatively, the blocks 1010 to 1050 may be implemented by the processors 102 and 202 of FIG. 26 and the block 1060 may be implemented by the transceivers 106 and 206 of FIG. 26.

Codewords may be converted into radio signals via the signal processing circuit 1000 of FIG. 27. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 27. For example, the wireless devices (e.g., 100 and 200 of FIG. 26) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 28:
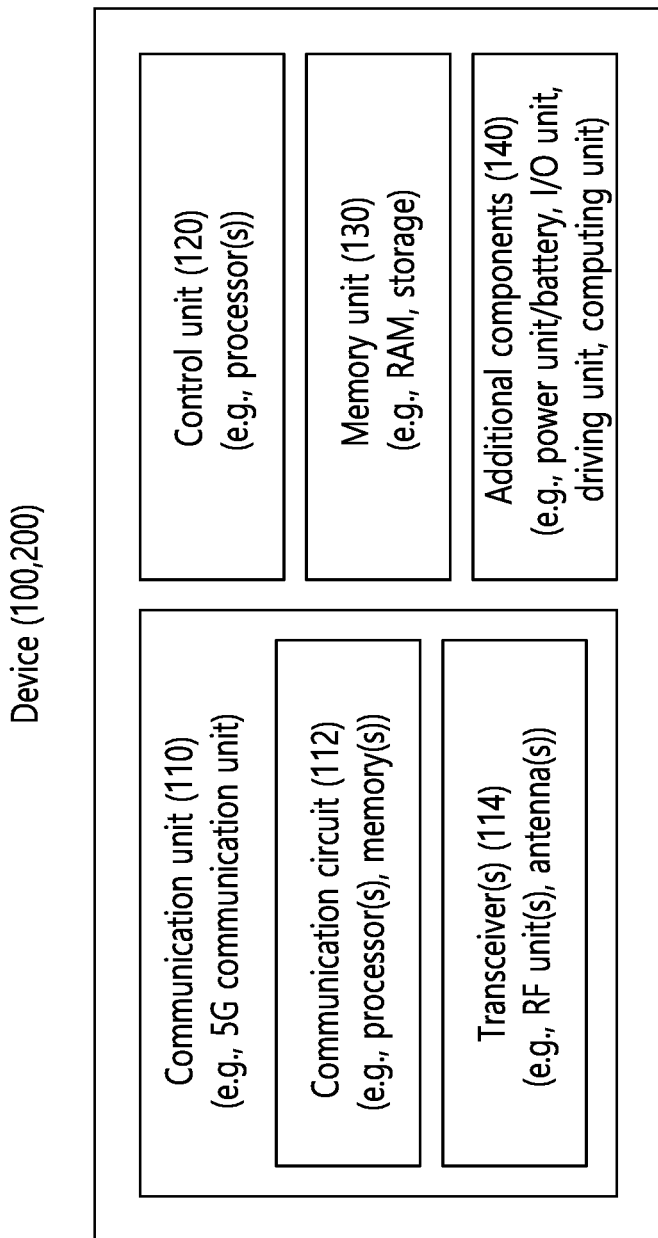
FIG. 28 shows a wireless device, in accordance with an embodiment of the present disclosure.

FIG. 28 shows another example of a wireless device, in accordance with an embodiment of the present disclosure. The wireless device may be implemented in various forms according to a use-case/service (refer to FIG. 25).

Referring to FIG. 28, wireless devices 100 and 200 may correspond to the wireless devices 100 and 200 of FIG. 26 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 26. For example, the transceiver(s) 114 may include the one or more transceivers 106 and 206 and/or the one or more antennas 108 and 208 of FIG. 26. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100*a* of FIG. 25), the vehicles (100*b*-1 and 100*b*-2 of FIG. 25), the XR device (100*c* of FIG. 25), the hand-held device (100*d* of FIG. 25), the home appliance (100*e* of FIG. 25), the IoT device (100*f* of FIG. 25), a digital broadcast terminal, a hologram device, a public safety device, an MTC device, a medicine device, a fintech device (or a finance device), a security device, a climate/environment device, the AI server/device (400 of FIG. 25), the BSs (200 of FIG. 25), a network node, etc. The wireless device may be used in a mobile or fixed place according to a use-example/service.

In FIG. 28, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 28 will be described in detail with reference to the drawings.

Figure 29:
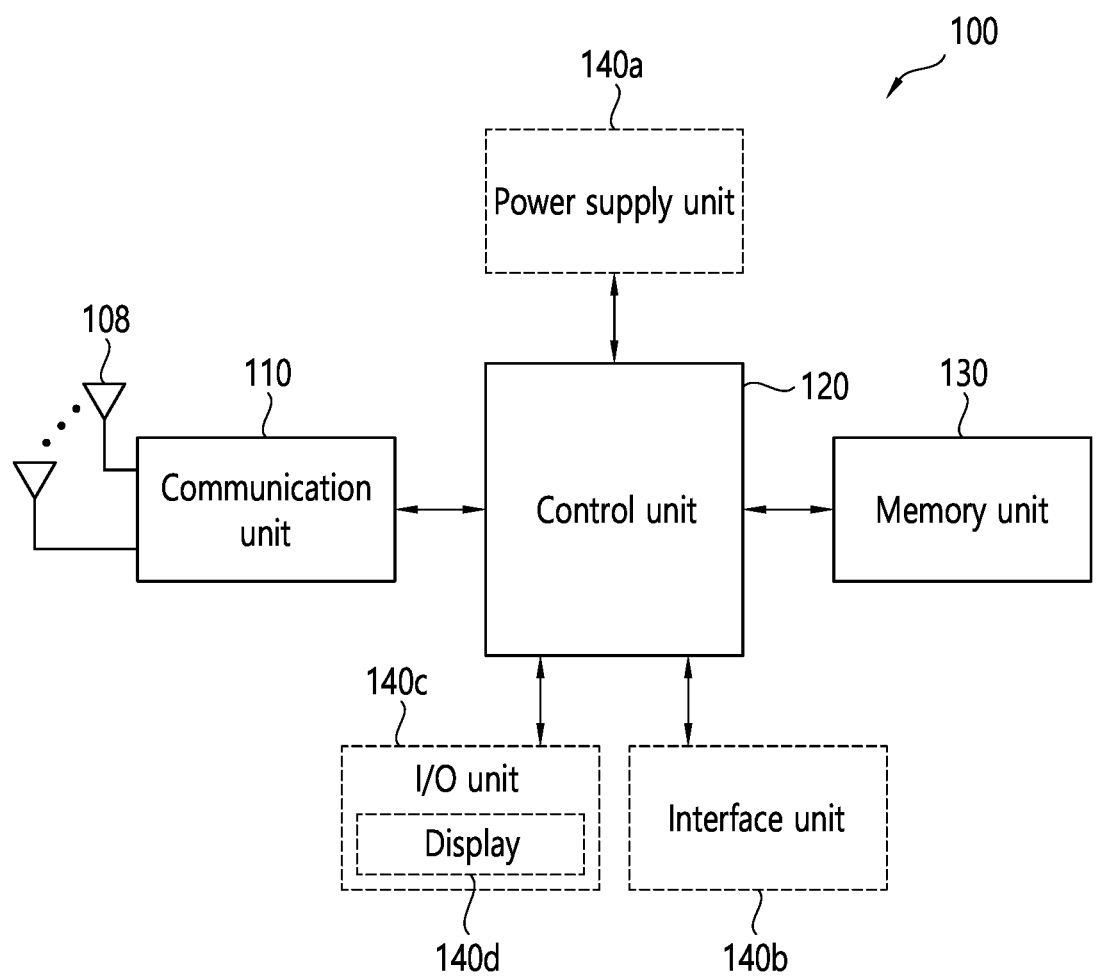
FIG. 29 shows a hand-held device, in accordance with an embodiment of the present disclosure.

FIG. 29 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 29, a hand-held device 100 may include an antenna unit 108, a communication unit 110, a control unit 120, a memory unit 130, a power supply unit 140*a*, an interface unit 140*b*, and an I/O unit 140*c*. The antenna unit 108 may be configured as a part of the communication unit 110. Blocks 110 to 130/140*a* to 140*c* correspond to the blocks 110 to 130/140 of FIG. 28, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140*a* may supply power to the hand-held device 100 and include a wired/wireless charging circuit, a battery, etc. The interface unit 140*b* may support connection of the hand-held device 100 to other external devices. The interface unit 140*b* may include various ports (e.g., an audio I/O port and a video I/O port) for connection with external devices. The I/O unit 140*c* may input or output video information/signals, audio information/signals, data, and/or information input by a user. The I/O unit 140*c* may include a camera, a microphone, a user input unit, a display unit 140*d*, a speaker, and/or a haptic module.

As an example, in the case of data communication, the I/O unit 140*c* may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140*c*.

FIG. 30 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 30, a vehicle or autonomous vehicle 100 may include an antenna unit 108, a communication unit 110, a control unit 120, a driving unit 140*a*, a power supply unit 140*b*, a sensor unit 140*c*, and an autonomous driving unit 140*d*. The antenna unit 108 may be configured as a part of the communication unit 110. The blocks 110/130/140*a* to 140*d* correspond to the blocks 110/130/140 of FIG. 28, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method for performing wireless communication by a first device, the method comprising:
    obtaining first information regarding a number of physical resource blocks (PRBs) for a physical sidelink control channel (PSCCH) and second information regarding a size of a subchannel for sidelink communication;
    mapping a physical sidelink shared channel (PSSCH) demodulation reference signal (DMRS) to a PSSCH DMRS symbol in a slot related to a PSSCH,
    wherein a position of the PSSCH DMRS symbol does not overlap a position of a PSCCH symbol in the slot related to the PSSCH, based on the number of the PRBs for the PSCCH being less than the size of the subchannel; and
    transmitting the PSSCH DMRS to a second device.

2. The method of claim 1, wherein a 1st symbol in the first slot includes an automatic gain control (AGC) symbol.

3. The method of claim 1, wherein the PSSCH DMRS is mapped to the PSSCH DMRS symbol which is after a last symbol of the PSCCH symbol based on a number of at least one PSSCH DMRS symbol including the PSSCH DMRS symbol being less than or equal to a pre-configured threshold.

4. The method of claim 3, wherein time division multiplexing (TDM) is performed on a resource related to the PSCCH and a resource related to the first PSSCH.

5. The method of claim 1 wherein the PSSCH DMRS symbol is mapped to a 4th symbol or a 9th in the slot based on the length of the resources for the PSSCH being 9.

6. The method of claim 1,
    wherein the number of PRBs for the PSCCH is a frequency size of the PSCCH, and
    wherein the size of the subchannel is a frequency size of the subchannel.

7. The method of claim 1, wherein the position of the PSSCH DMRS symbol does not overlap the position of the PSCCH symbol, based on the PRBs for the PSCCH being less than the size of the subchannel and the size of the subchannel being less than a threshold.

8. The method of claim 7, wherein the threshold is 20 PRBs.

9. A first device for performing wireless communication, the first device comprising:
    one or more memories storing instructions;
    one or more transceivers; and
    one or more processors connected to the one or more memories and the one or more transceivers,
    wherein the one or more processors execute the instructions to:
    obtain first information regarding a number of physical resource blocks (PRBs) for a physical sidelink control channel (PSCCH) and second information regarding a size of a subchannel for sidelink communication;
    map a physical sidelink shared channel (PSSCH) demodulation reference signal (DMRS) to a PSSCH DMRS symbol in a slot related to a PSSCH,
    wherein a position of the PSSCH DMRS symbol does not overlap a position of a PSCCH symbol in the slot related to the PSSCH, based on the number of the PRBs for the PSCCH being less than the size of the subchannel; and
    transmit the PSSCH DMRS to a second device.

10. A device configured to control a first user equipment (UE), the device comprising:
    one or more processors; and
    one or more memories being operably connectable to the one or more processors and storing instructions,
    wherein the one or more processors execute the instructions to:
    obtain first information regarding a number of physical resource blocks (PRBs) for a physical sidelink control channel (PSCCH) and second information regarding a size of a subchannel for sidelink communication;
    map a physical sidelink shared channel (PSSCH) demodulation reference signal (DMRS) to a PSSCH DMRS symbol in a slot related to a PSSCH, wherein a position of the PSSCH DMRS symbol does not overlap a position of a PSCCH symbol in the slot related to the PSSCH, based on the number of the PRBs for the PSCCH being less than the size of the subchannel; and transmit the PSSCH DMRS to a second UE.

* * * * *